United States Patent [19]

Sakakibara et al.

[11] Patent Number: 4,669,780

[45] Date of Patent: Jun. 2, 1987

[54] DEVICE FOR CONTROLLING POWER SEATS IN VEHICLE

[75] Inventors: Kazuo Sakakibara, Toyokawa; Satosi Kuwakado, Aichi; Toshiaki Shimogawa, Okazaki; Masahiro Taguchi, Aichi; Sadahisa Onimaru, Nishio; Toshikazu Ina, Nagoya, all of Japan

[73] Assignee: Nippon Soken, Inc., Nishio, Japan

[21] Appl. No.: 760,590

[22] Filed: Jul. 30, 1985

[30] Foreign Application Priority Data

| Jul. 31, 1984 | [JP] | Japan | 59-159247 |
| Jul. 31, 1984 | [JP] | Japan | 59-159251 |
| Jul. 31, 1984 | [JP] | Japan | 59-159248 |
| Jul. 31, 1984 | [JP] | Japan | 59-159249 |
| Jul. 31, 1984 | [JP] | Japan | 59-159250 |

[51] Int. Cl.$^4$ .............. A47C 15/00; B60N 1/06; B60N 1/10
[52] U.S. Cl. .................. 297/257; 296/64; 296/65 R; 297/63; 297/194; 297/232; 297/241; 297/330; 297/410
[58] Field of Search .............. 297/63–67, 297/330, 232, 257, 240, 241, 194, 410; 296/65 R, 64, 69, 65 A

[56] References Cited

U.S. PATENT DOCUMENTS

| 1,719,815 | 7/1929 | Thompson | 297/257 |
| 3,666,319 | 5/1972 | Moloney, Jr. | 297/330 X |
| 3,934,928 | 1/1976 | Johnson | 297/330 X |
| 4,128,797 | 12/1978 | Morata | 297/330 X |
| 4,190,284 | 2/1980 | Schmidhuber et al. | 297/194 |
| 4,341,415 | 7/1982 | Braun et al. | 296/65 R |
| 4,379,588 | 4/1983 | Speice | 297/330 X |
| 4,416,488 | 11/1983 | Wall | 297/194 X |
| 4,451,887 | 5/1984 | Harada et al. | 296/65 R X |
| 4,516,805 | 5/1985 | Leeper et al. | 297/330 |

FOREIGN PATENT DOCUMENTS

| 82664 | 6/1983 | European Pat. Off. | 297/330 |
| 2933093 | 2/1981 | Fed. Rep. of Germany | 297/330 |
| 2512405 | 3/1983 | France | 297/330 |
| 56-124521 | 9/1981 | Japan . | |
| 11126 | 1/1982 | Japan | 297/330 |
| 18522 | 1/1982 | Japan | 297/257 |
| 58-43830 | 3/1983 | Japan . | |
| 58-61027 | 4/1983 | Japan . | |
| 58-76335 | 5/1983 | Japan . | |
| 58-118426 | 7/1983 | Japan . | |
| 58-214423 | 12/1983 | Japan . | |
| 1452940 | 10/1976 | United Kingdom | 297/330 |

*Primary Examiner*—Kenneth L. Dorner
*Assistant Examiner*—Mark W. Binder
*Attorney, Agent, or Firm*—Cushman, Darby & Cushman

[57] ABSTRACT

Apparatus for controlling a plurality of power seats in a vehicle includes a plurality of power seats, each having adjusting mechanisms for configuring the power seat in a number of different operational states. Operational state detectors then detect the operational state of each power seat. A switching device is provided for adjusting the adjustment mechanisms of the power seats to a desired operational state. Control apparatus is responsive to signals output from the operation state detection devices and the switching device for controlling the adjustment mechanisms of the power seats. The control apparatus causes each power seat to reach its desired operational state in response to the detected operational state of that seat and other power seats to prevent interference among the plurality of moving power seats.

17 Claims, 43 Drawing Figures

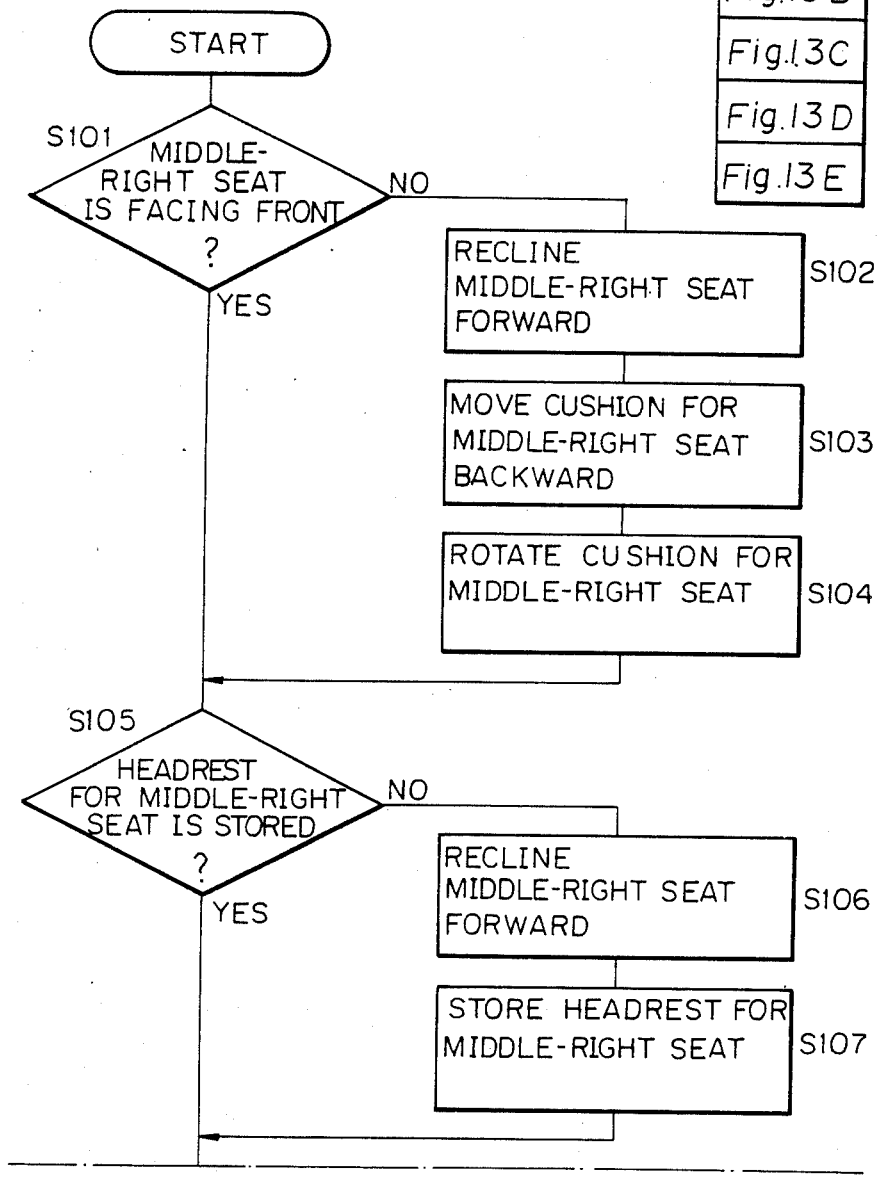

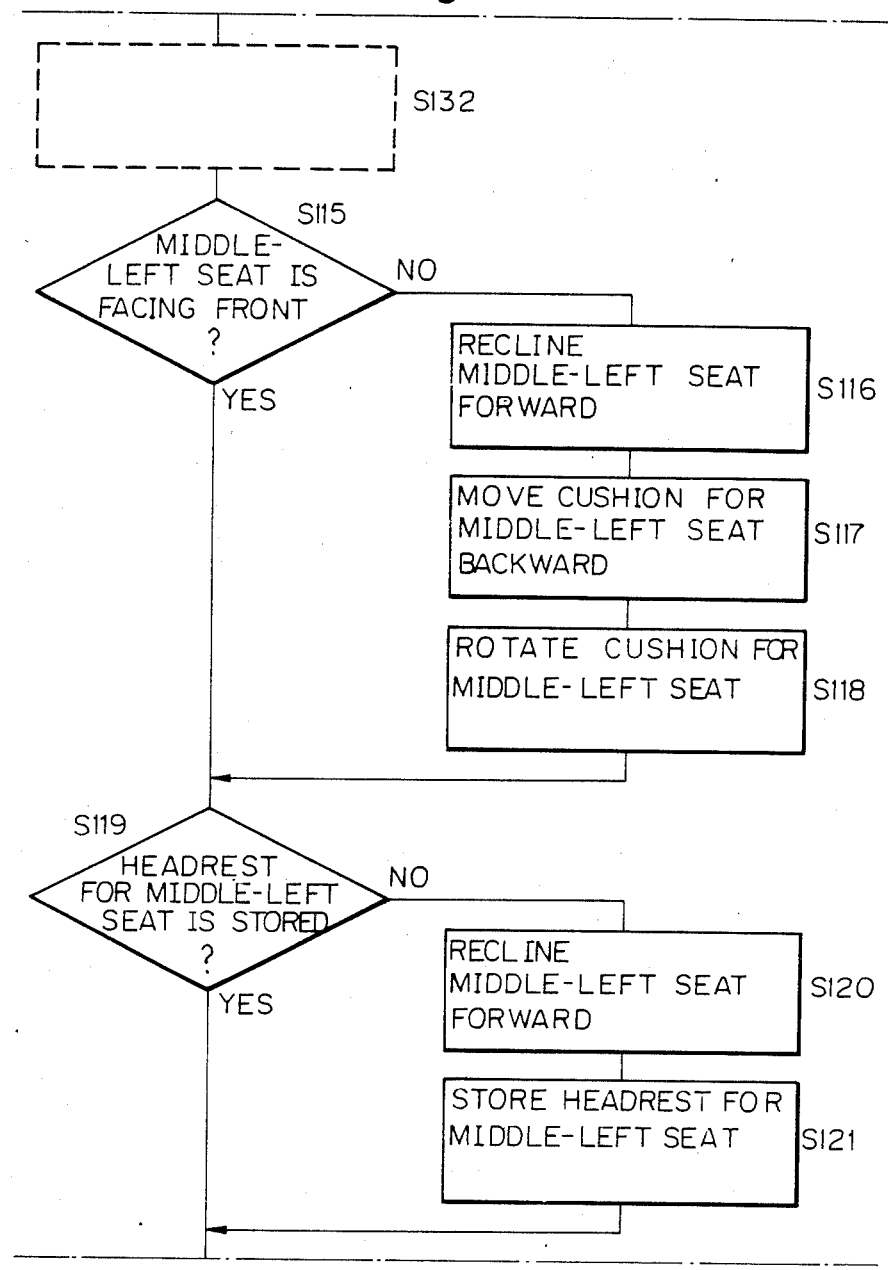

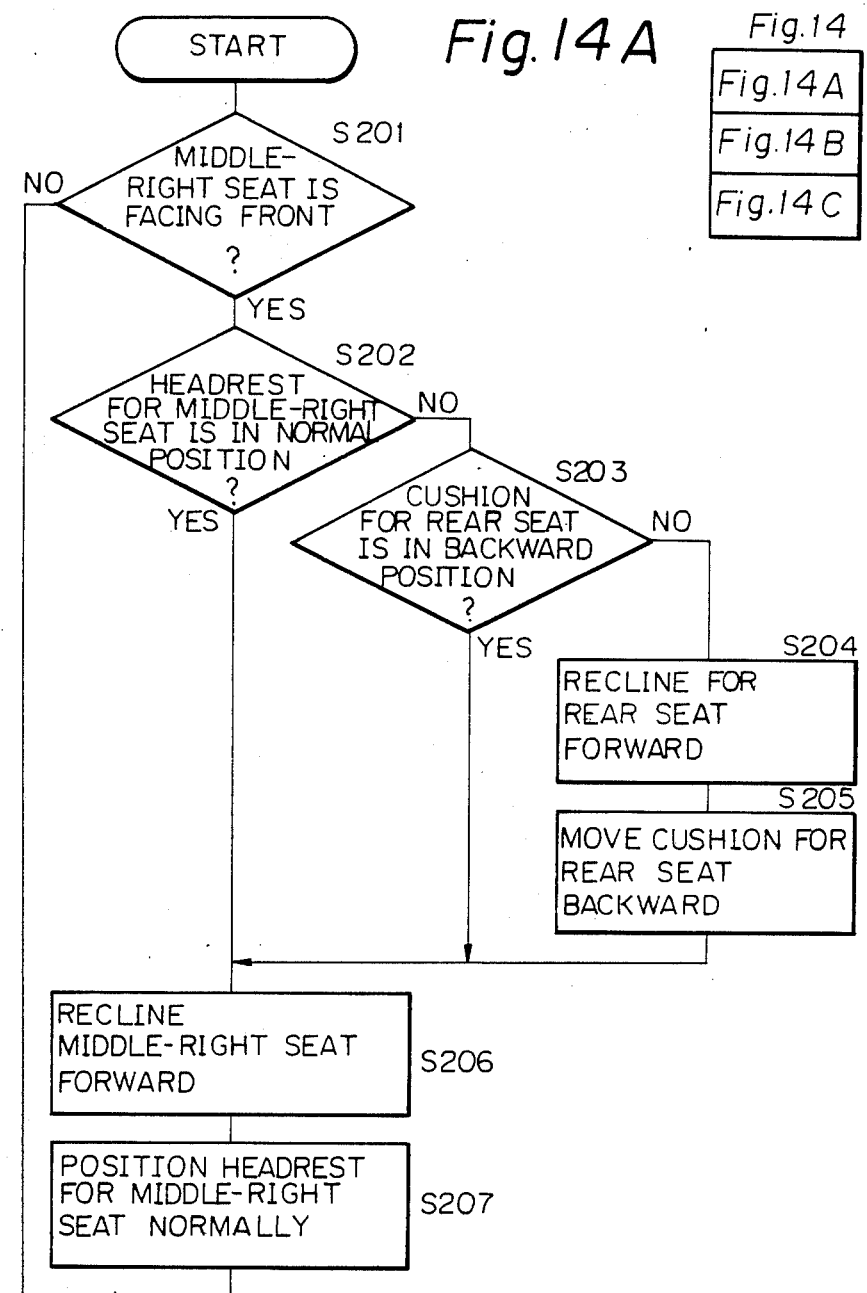

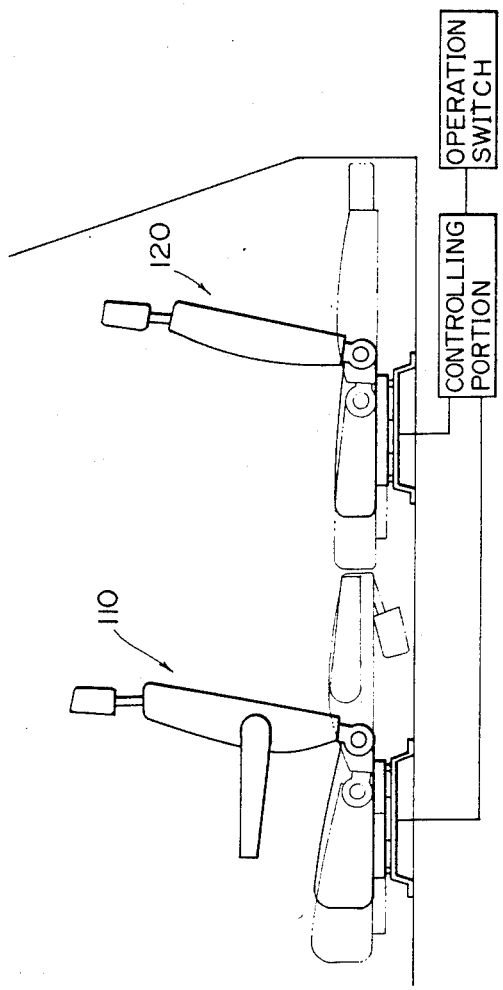

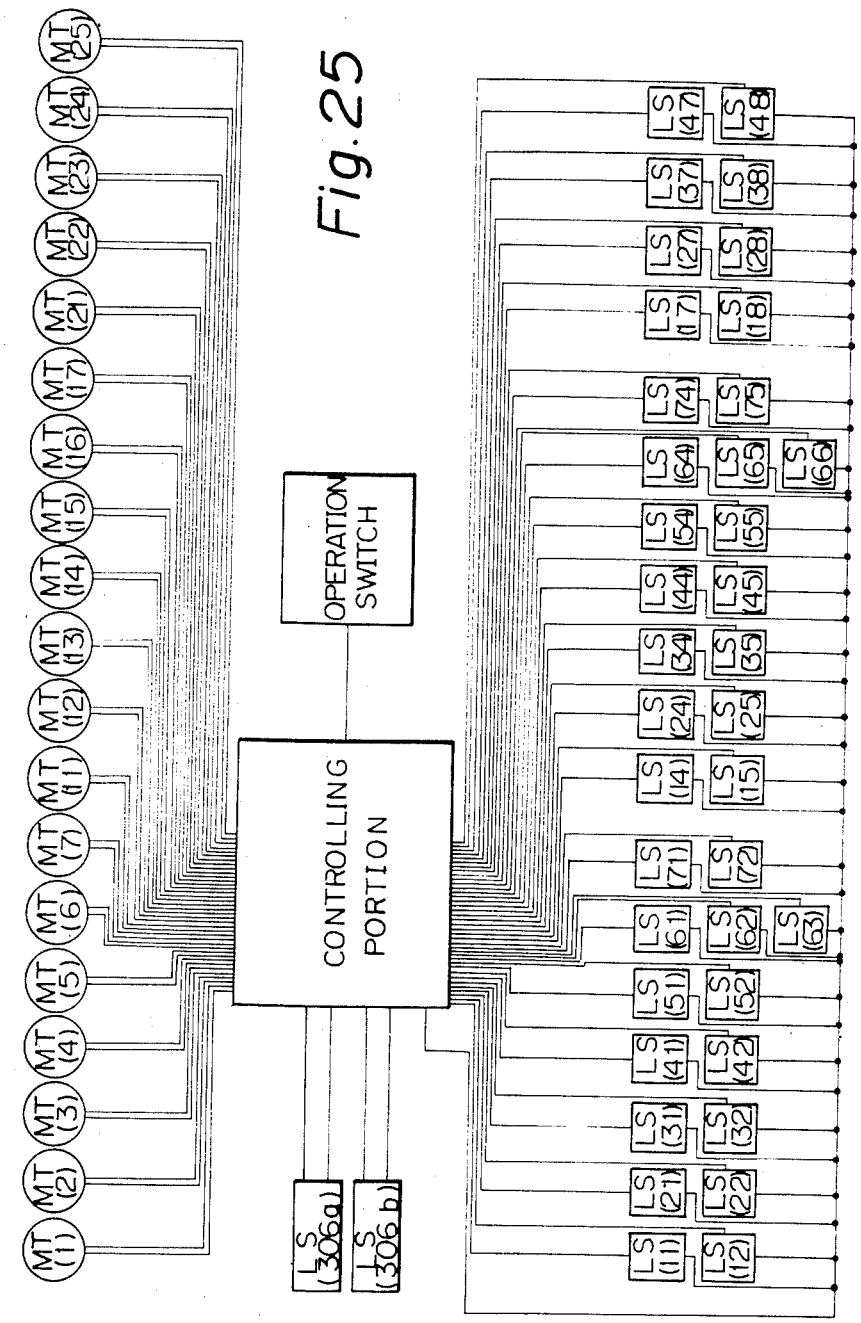

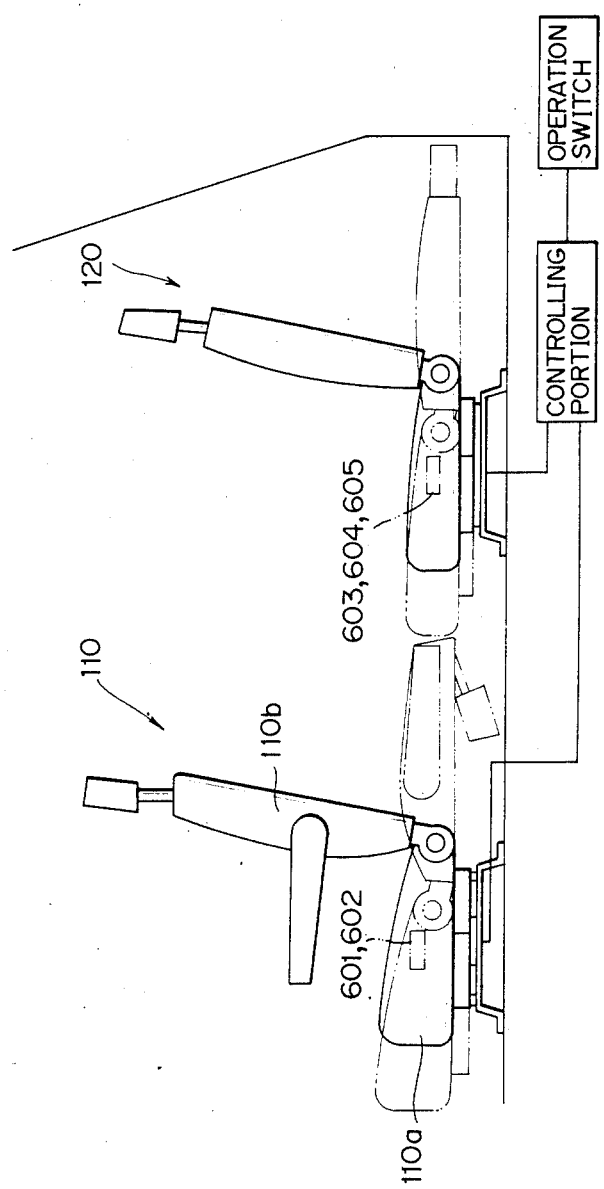

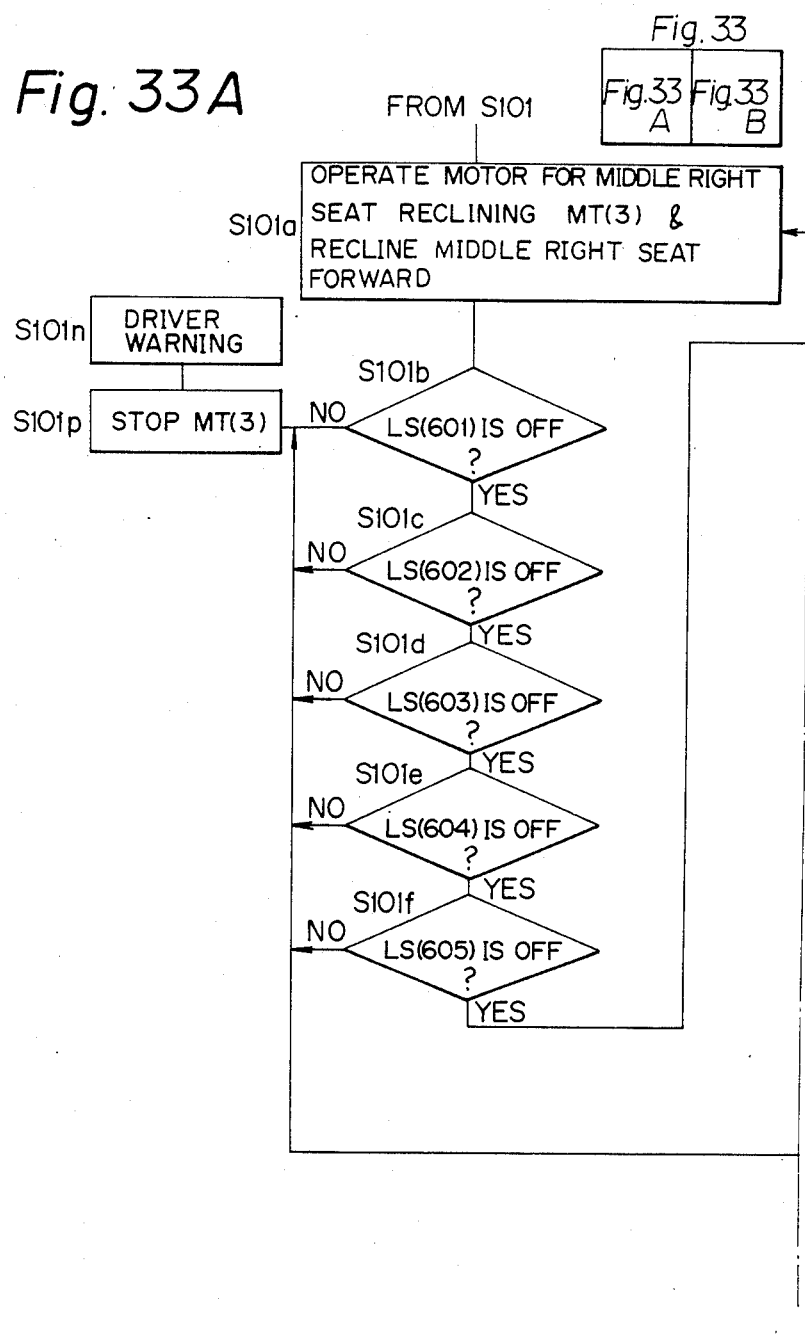

DEVICE FOR CONTROLLING POWER SEATS IN VEHICLE

BACKGROUND OF THE INVENTION

1. Field of the Invention

The present invention relates to a power seat controlling device. The device according to the present invention is used for power seats in a vehicle, particularly in a wagon-type vehicle.

2. Description of the Related Art

Bringing seats in a wagon-type vehicle to a fully-flat state or a face-to-face state has been generally laborious and time-consuming because of the number of levers that must be manually operated to achieve the desired seat-positioning. These days, most adjustable seats in a vehicle are driven by electric power. However, although this type of drive is suitable for a driver's seat of a general passenger car, for the middle or rear seats of a wagon-type vehicle the problem arises that the effect of an electric power mechanism provided for the seats is reduced if the operational sequence is not correctly set for the different portions of the seats to be driven.

SUMMARY OF THE INVENTION

An object of the present invention is to provide movable mechanisms driven by electric power, the operation of these movable mechanisms being sequentially carried out by using sensors for detecting a state of the movable mechanisms, a controlling portion for controlling the electric drive of the movable mechanisms, and operation switches to enable the power seats to be brought quickly, correctly, and easily to a selected state by the mechanisms of the power seats when setting the power seats.

According to the present invention, there is provided a power seat controlling device comprising operation state detection sensors for detecting the state of operation of the mechanisms of the power seats, operation switches for bringing the power seats to a selected operation state, and a controlling portion for controlling the bringing of the power seats to the selected operation state based on signals sent from the operation state detection sensors and the operation switches according to a predetermined sequence.

BRIEF DESCRIPTION OF THE DRAWINGS

FIGS. 9 and 10 show the construction of an armrest, in which FIG. 10 is a view seen from a direction X in FIG. 9;

FIGS. 13A-E and 14A-C are flow charts showing the flow of operation of the device shown in FIG. 1;

FIGS. 24A and 24B show other embodiments of the present invention;

FIG. 25 is a system diagram of a controlling portion and an operation switching portion of the device shown in FIGS. 24A and 24B;

FIGS. 31A and 31B show a power seat device according to other embodiments of the present invention;

DESCRIPTION OF THE PREFERRED EMBODIMENTS ((Fundamental Matters))

Figure 1:
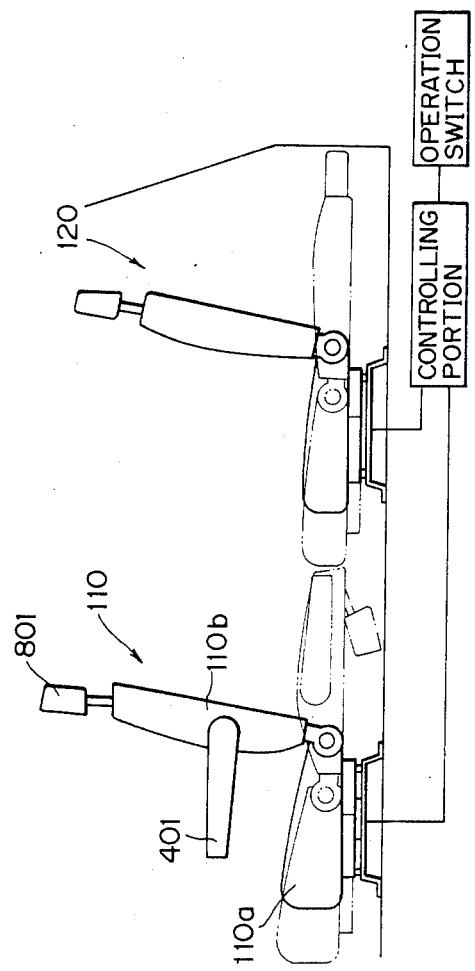
FIG. 1 shows power seats provided with a device according to an embodiment of the present invention.

FIG. 1 shows a power seat device according to an embodiment of the present invention. In FIG. 1, numeral 110 represents a middle seat and numeral 120 a rear seat of a wagon-type vehicle. In the device of FIG. 1, there are provided a controlling portion for controlling the power seats, and an operation switch fitted at an optional position in the vehicle.

Figure 2:
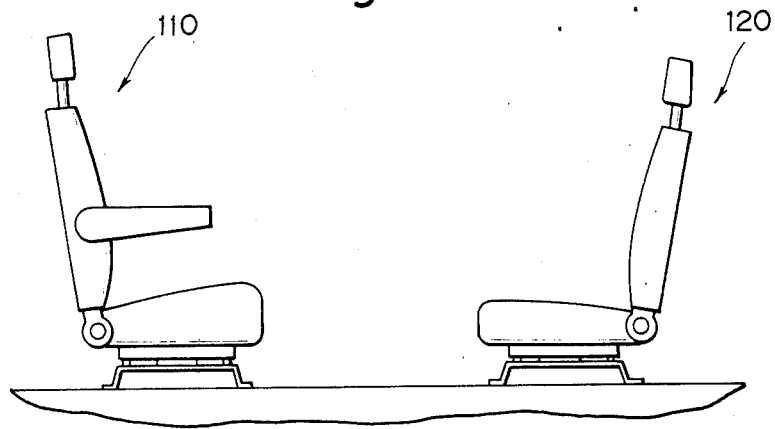
FIG. 2 shows a face-to-face state of the power seats shown in FIG. 1.
Figure 19:
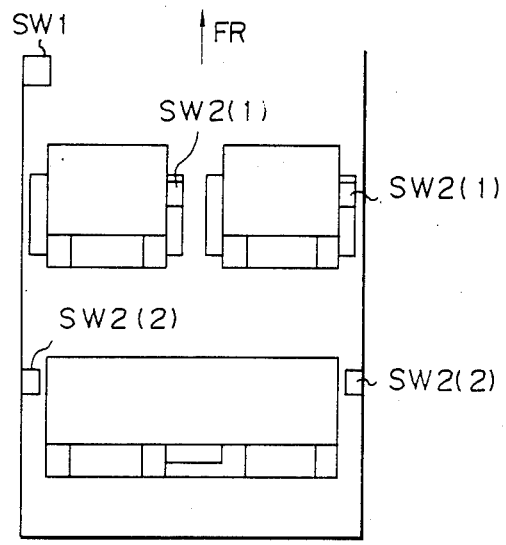
FIG. 19 shows an example of an arrangement of the operation switches.

As shown in FIG. 19, the operation switch SW comprises an automatic operation switch SW1 for automatically bringing the seats to a face-to-face or a fully-flat state, and a manual switch SW2 for operating the motor at the seat to adjust the seat according to the user's needs. The automatic operation switch SW1 and the manual switch SW2 can be fitted at optional positions in the vehicle room. In this embodiment of the present invention, the automatic operation switch SW1, manual switches SW2(1) for middle seats, and manual switches SW2(2) for a rear seat are fixed at the positions shown in FIG. 19. Details of these switches will be explained hereinafter. The broken lines in FIG. 1 illustrate a fully-flat state of the seats shown in the figure. A face-to-face state of the seats as shown in FIG. 1 is illustrated in FIG. 2.

((Mechanism of Power Seats))

Figure 7:
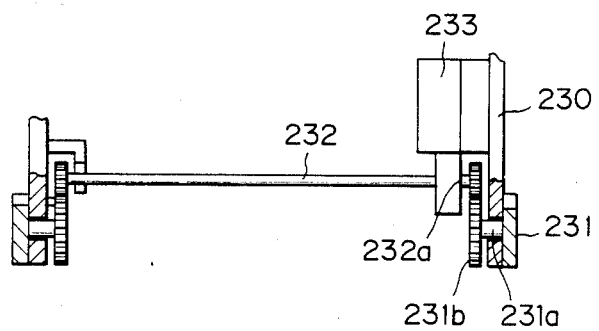
FIG. 7 is a drawing taken along the line VII—VII shown in FIG. 3, showing the construction of a reclining mechanism.
Figure 8:
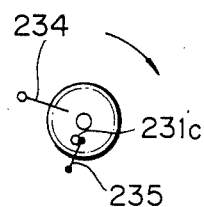
FIG. 8 shows a stopper pin and a limit switch included in the reclining mechanism.
Figure 9:
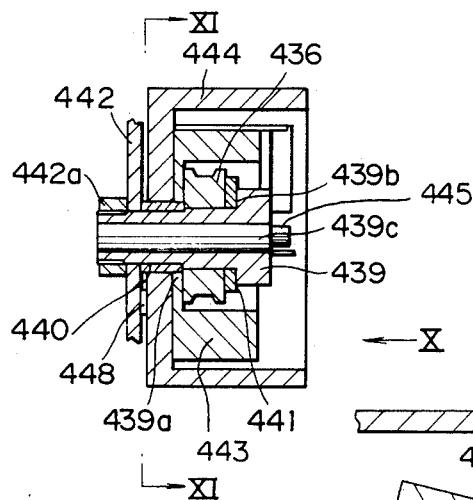
Figure 10:
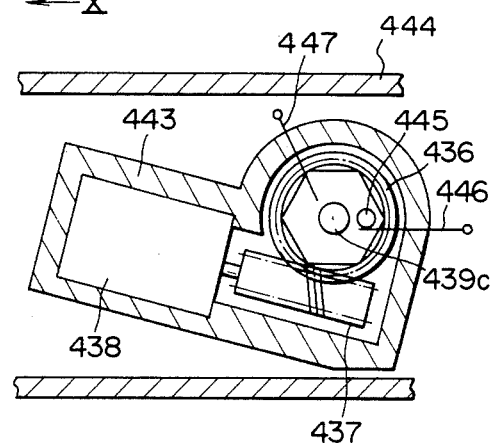
Figure 11:
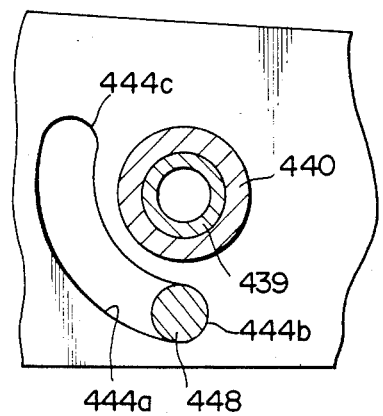
FIG. 11 is a drawing taken along the line XI—XI shown in FIG. 9, showing a locking mechanism of the armrest.

The rotational movement and the back-and-forth movement of the power seat are now explained as follows. The mechanism of the power seat is shown in FIGS. 3 to 11 and 15 to 18. FIGS. 3, 4A, 4B, 5, 7, and 8 are concerned with a middle-left seat, and FIGS. 9, 10, and 11 show details of a left armrest of the middle-left seat.

Figure 4A:
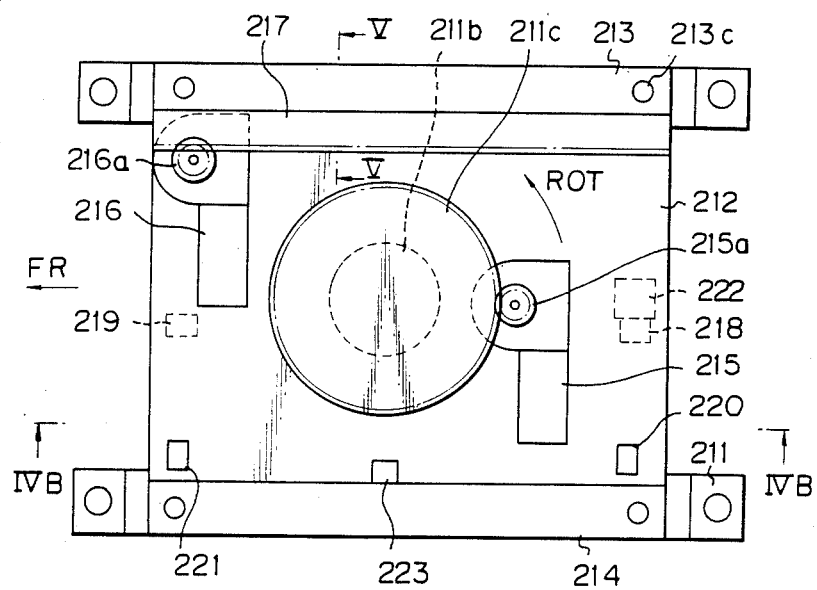
FIG. 4A is a drawing taken along the line IVA—IVA shown in FIG. 3.
Figure 4B:
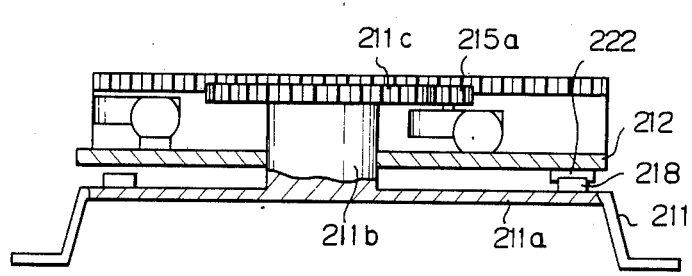
FIG. 4B is a drawing taken along the line IVB—IVB shown in FIG. 4A.

In FIGS. 4A and 4B, legs 211 are provided for fixing a middle seat 110 to the floor by means of bolts (not shown). The legs 211 have a flat plate portion 211a therebetween connecting the left and right legs together. A supporting shaft 211b is provided at the center of the flat plate portion 211a, and a large spur gear 211c is provided on the top face of the supporting shaft 211b.

Figure 5:
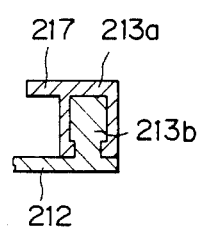
FIG. 5 is a drawing taken along the line V—V shown in FIG. 4A.

A turntable 212 is rotatably supported by the supporting shaft 211b. In FIG. 4A, an arrow mark FR indicates the front of the seat, i.e., the driving direction of the vehicle, and an arrow mark ROT indicates the direction of rotation of the seat. At both ends of the turntable 212, are provided a right rail 213 and a left rail 214, respectively. As shown in FIG. 5, the right rail 213 comprises a right-upper rail 213a and a right-lower rail 213b, the right-upper rail 213a being smoothly slidable on the right-lower rail 213b. The left rail 214 has the same construction as that of the right rail 213. The upper rails of the right rail 213 and the left rail 214 are fixed to a seat cushion 110a (FIG. 3) of the middle seat 110.

A motor 215 is fixed to and causes the rotation of the turntable 212, with an output gear 215a of the motor 215 being always engaged with the above large spur gear 211c. A motor 216 is fixed to and causes back-and-forth movement of the seat cushion 110a, with an output gear 216a of the motor 216 being always engaged with a rack 217 fixed to the right rail 213.

The numerals 218, 219, 220, and 221 in the figure represent limit switches. When the seat (e.g., 110) faces the driving direction FR of the vehicle, the limit switch 218 is in contact with a stopper 222 fixed to the turntable 212 and is in an ON state. If the seat is facing in the direction opposite to the driving direction FR of the vehicle, the limit switch 219 is in contact with the stopper 222 and is in an ON state. The seat can be rotated from a state shown in FIG. 3 in an anticlockwise direction ROT to face the direction opposite to the driving direction FR of the vehicle.

The limit switch 220 is switched to an ON state by a stopper 223 fixed to the left rail 214, when the seat reaches a rear end limit position. The limit switch 221 is switched to an ON state when the seat reaches a front end limit position.

Figure 6:
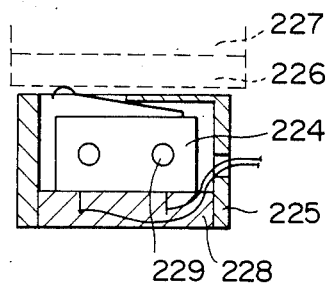
FIG. 6 shows the construction of a limit switch.

FIG. 6 shows the construction of the limit switches 218, 219, 220, and 221. In the figure, 224 represents a conventional limit switch, 225 a guide, 228 a coating material for protecting a terminal of the limit switch 224, and 229 a pin supported by the guide 225 and supporting the limit switch 224 at a predetermined position. A stopper 227 includes a hard rubber piece 226 which is used as a damper. FIG. 6 shows a state in which the limit switch 224 is turned ON. A small gap is set between the hard rubber piece 226 and the guide 225. The guide 225 is strongly constructed. When the stopper 227 approaches and turns ON the limit switch 224, the stopper 227 continues to move due to the inertia force of the member to which the stopper 227 is fixed, even after the power supply for the motor is cut by the controlling portion. As the result, a stopper 227 collides with the guide 225. Since the hard rubber piece 226 is positioned between the stopper 227 and the guide 225, the hard rubber piece 226 acts as a damper and thus the stopper 227 collides quietly and smoothly with the guide 225 when stopped thereby.

Figure 3:
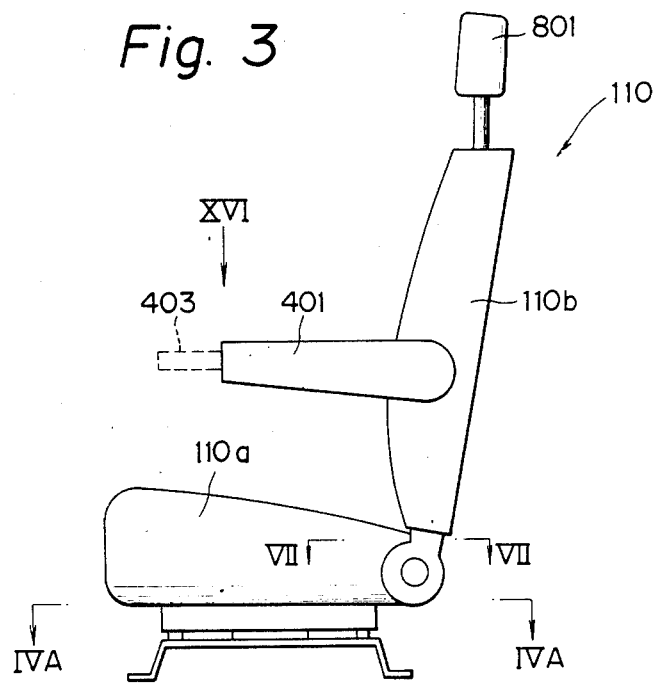
FIG. 3 shows a middle seat located on the left-hand side in the vehicle room (hereinafter called the "middle-left seat")

The reclining mechanism of the power seat will be explained with reference to FIG. 7. A motor 233 is fixed to a frame 230 of the seat cushion 110a (FIG. 3). A supporting shaft 231a, which is a pivot center of a seat back frame 231, is supported in a freely rotatable state by the frame 230. The supporting shaft 231a has a spur gear 231b which is always engaged with an output gear 232a of the motor for reclining the seat back. In addition to the spur gear 231b, a stopper pin 231c is provided as shown in FIG. 8. In FIG. 8, the seat back is in an upright position, and a limit switch 235 is in an ON state. When bringing the seat to a horizontal position i.e., fully-flat position, the spur gear 231b rotates in a clockwise direction in FIG. 8 to move the stopper pin 231c, thus turning the limit switch 234 ON.

The armrest is explained as follows. The driving portion of the armrest is explained with reference to FIGS. 9 and 10. A worm wheel 436, a worm 437, a motor 438 for the armrest, a bolt 439, a spacer 440, and a belleville spring 441 are provided for the armrest. The worm wheel 436 is driven by the worm 437 connected directly to the motor 438 for the armrest, the worm wheel 436 being supported in a freely rotatable state by the bolt 439. The bolt 439 is fitted by means of a nut 442a fixed to the seat back frame 442. The spacer 440 maintains a fixed distance between the seat back frame 442 and a stopper portion 439a of the bolt 439. The stopper portion 439a and the lower face of a hexagonal portion of the bolt 439 are fitted in such a manner that they are at a fixed distance, and the worm wheel 436 and the belleville spring 441 are arranged within that distance. As a result, the holding force generated by friction between the bolt 439 and the worm wheel 436 can be changed by changing the characteristic of the belleville spring.

If a torque exceeding a predetermined value is applied to the armrest, the worm wheel 436 will slip around the bolt 439, and thus the torque exceeding the tolerance value is not applied to the worm wheel 436 and the worm 437. Therefore, the armrest can be also operated manually.

The motor 438 for the armrest is fixed to a housing 443 which is fixed to an armrest frame 444. The armrest frame 444 is fixed in a freely rotatable state to the spacer 440, and covered with a facing. A stopper pin 445 is fitted to the upper end face of the bolt 439.

FIG. 10 shows the armrest in the regular position with respect to the seat back. In this state, the stopper pin 445 is in contact with and turns ON a limit switch 446. If the armrest is brought to a parallel position with respect to the seat back, i.e., a fully-flat position, the armrest is turned in a clockwise direction in FIG. 10, and thus the stopper pin 445 is in contact with and turns ON a limit switch 447.

When the armrest is in either the parallel position or the regular position with respect to the seat back, the armrest is arranged not to be able to rotate further beyond such position.

FIG. 11 shows a locking mechanism of the armrest. The mechanism comprises a stopper pin 448 provided for the seat back frame 442, and a groove 444a provided for the armrest frame 444. The tip of the stopper pin 448 is always received within the groove 444a. If the armrest is in an upright position with respect to the seat back, the stopper pin 448 abuts against an end 444b of the groove 444a to prevent the armrest from rotating further. If the armrest is in a parallel position with respect to the seat back, the stopper pin 448 abuts against an end 444c of the groove 444a to prevent the armrest from rotating further. The stopper pin 445 is in contact with the limit switch 446 when the stopper pin 448 abuts against the end 444b, and the stopper pin 445 is in contact with the limit switch 447 when the stopper pin 448 abuts against the end 444c.

Figure 15:
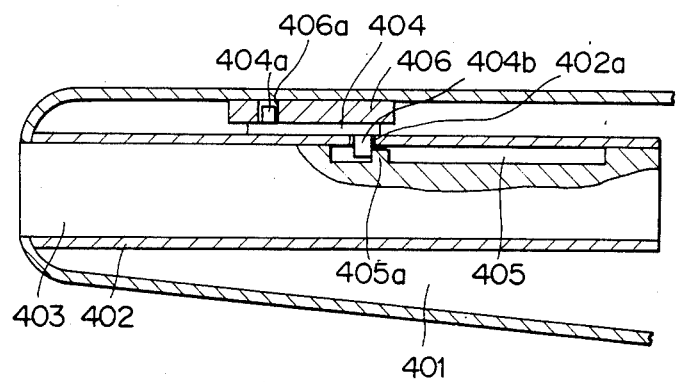
FIG. 15 shows an armrest portion of the device shown in FIG. 1.
Figure 16:
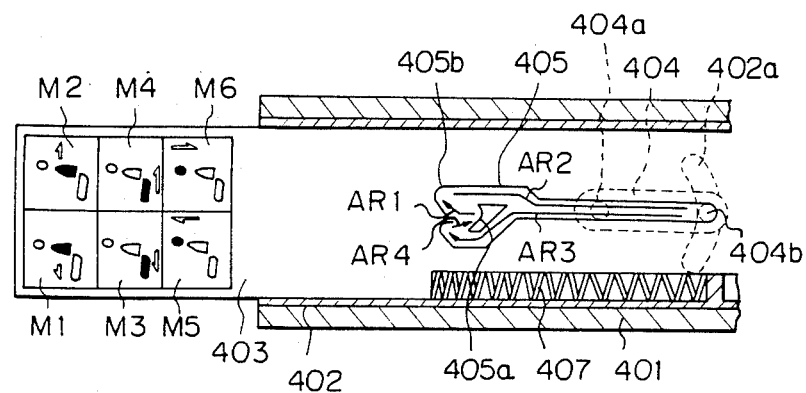
FIG. 16 is a view seen from a direction XVI in FIG. 3, showing the construction of an operation switch provided at the armrest portion shown in FIG. 15.

The construction of the manual switch SW2(1) to be used for the armrest, the middle-right seat, and the middle-left seat is shown in FIGS. 15 and 16. The manual switch SW2(1) is shown in FIG. 16. FIG. 16 shows the manual switch SW2(1) when pulled out, and FIG. 15 shows it in an inserted state. The switch comprises a guide 402 fixed within the armrest 401, a switch box 403 slidably enclosed in the guide 402, a stopper lever 404, and a cam groove 405. The stopper lever 404 is rotatably received in a hole 406a of a plate 406 supported by a shaft 404a fixed within the armrest 401. A sliding pin 404b is slidably received in an elongated hole 402a formed around the supporting shaft 404a provided for the guide 402. The sliding pin 404b passes through the elongated hole 402a and projects into the cam groove 405. A spring 407 is fixed at one end to the switch box 403 and at the other end to the guide 402, so that the spring 407 presses the switch box 403 toward a position outside of the armrest.

The switch box 403 is usually received within the armrest 401 as shown in FIG. 15, wherein the slide pin 404b abuts against a stopper portion 405a of the groove 405. When the switch box 403 is pushed inside the armrest 401, the slide pin 404b is moved in the direction of an arrow marked AR1 shown in FIG. 16 and is stopped by a wall 405b. When the pressure on the switch box 403 is released, the switch box 403 is returned to the position outside the armrest by the force of the spring 407, and the slide pin 404b moves in the direction of an arrow marked AR2, as shown in FIG. 16. At this point, operation of the power seat can be carried out. After completing the operation, the switch box 403 is again pushed inside the armrest 401 against the force of the spring 403, and the slide pin 404b moves in the direction of an arrow mark AR3 shown in FIG. 16. When the pressure on the switch box 403 is released, the switch box 403 is pushed by the force of the spring 407, and the slide pin 404b moves in the direction of an arrow mark AR4 shown in FIG. 16, so that the switch box is returned to the original position within the armrest 401. A harness passes through a hole 439c (FIG. 9) provided at the center of an armrest set bolt 439 and into the seat back.

Although in the above explanation the switch is enclosed within the armrest, the switch can be arranged on the upper surface of the armrest and provided with a covering lid, to facilitate operation.

Figure 17:
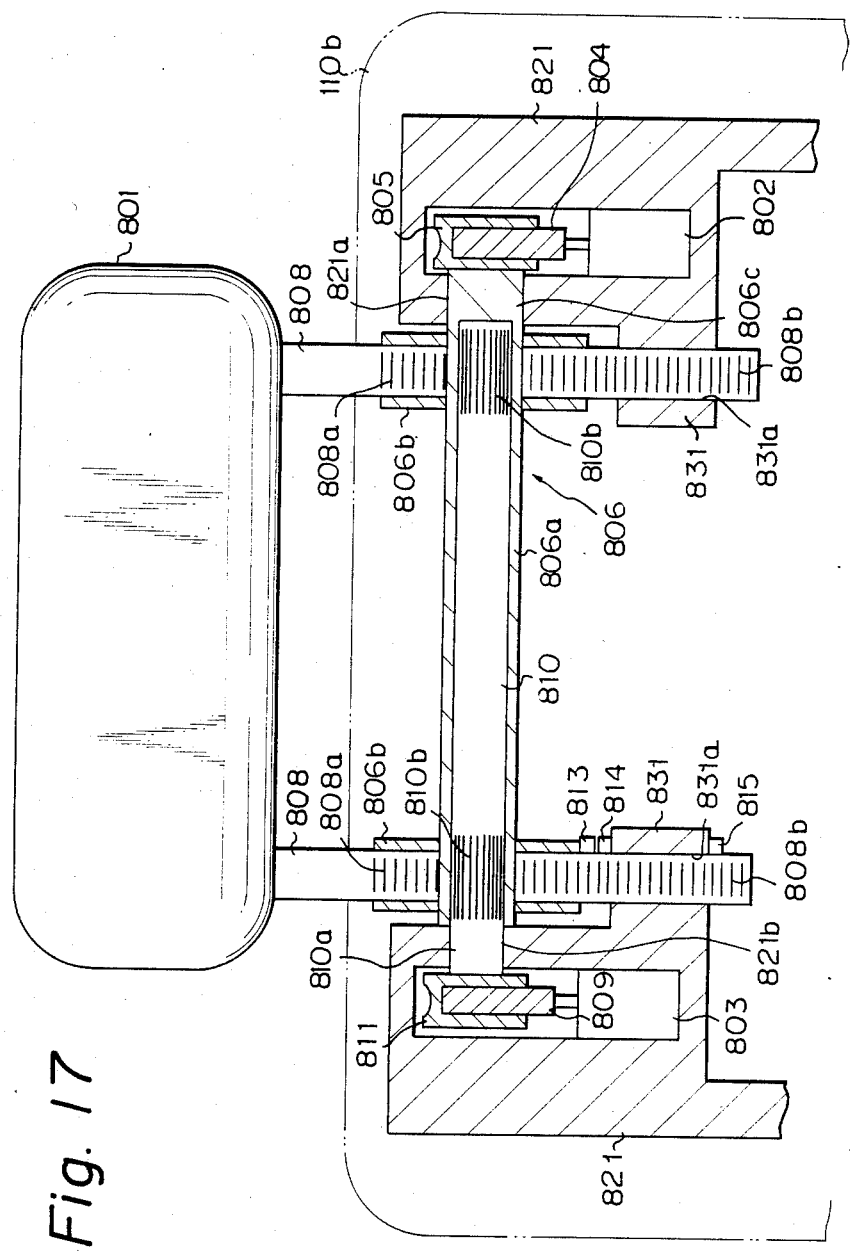
FIGS. 17 and 18 show the construction of a headrest for a middle seat located on the right-hand side in the vehicle room (hereinafter called the "middle-right seat")
Figure 18:
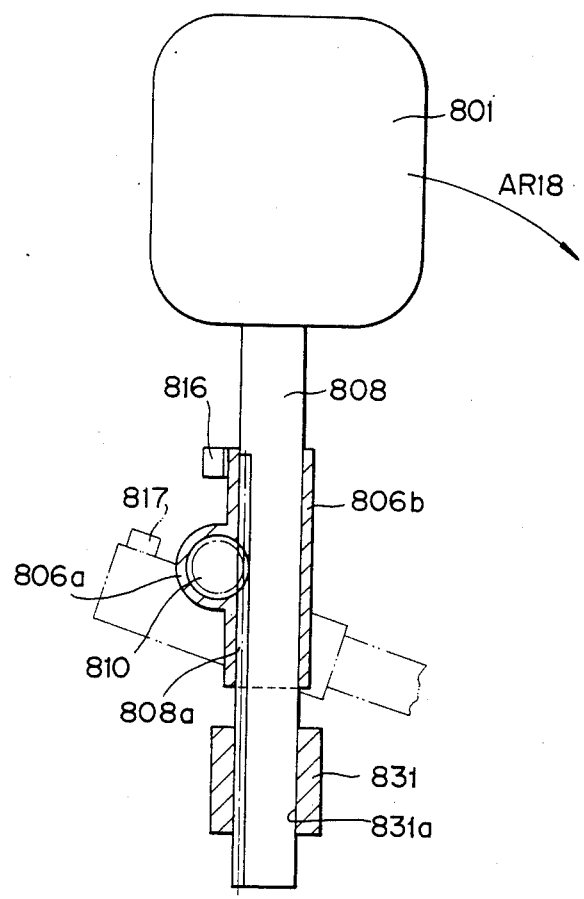

The construction of the headrest for a middle-left seat is shown in FIGS. 17 and 18. FIG. 17 shows the constitution and FIG. 18 a side view of the headrest shown in FIG. 1. In FIG. 17, 821 represents a frame forming the external shape of a backrest 110b. A first compact motor 802 and a second compact motor 803 are arranged on the left-hand and the right-hand sides of the upper part of the frame 821. The output shaft of the first compact motor 802 is coupled with a worm gear 804 engaged with a worm wheel 805. The worm wheel 805 is connected to a hollow guide pipe 806, one end of the guide pipe 806 being supported by the frame 821. The guide pipe 806 comprises a horizontal pipe 806a extending horizontally, and vertical pipes 806b extending vertically and arranged at both ends of the horizontal pipe 806a. One end 806c (on the right in the figure) of the horizontal pipe 806a is inserted in and supported by a hole 821a of the frame 821. The worm wheel 805 is fixed to the end 806c of the horizontal pipe 806a.

A headrest 801 for supporting a passenger's head is located above the backrest 110b and has two legs 808 inserted in the vertical pipes 806b. The ends 808b of the legs 808 are further inserted in holes 831a of guides 831 formed by projected portions of the frame 821. Ladder racks 808a are formed on the peripheries of the two legs 808.

The output shaft of a second compact motor 803 is connected to a worm gear 809 engaged with a worm wheel 811 coupled to one end 810a of a shaft 810. The shaft 810 is enclosed within the horizontal pipe 806a. This one end 810a of the shaft 810 is inserted in and supported by a hole 821b provided in the frame 821. The periphery of the shaft 810 has pinions 810b formed thereon at intersections with the legs 808 of the headrest 801, and the pinions 810b and ladder racks 808a of the legs 808 are engaged with each other.

Numerals 813, 814, and 815 represent limit switches for detecting the positions of the ends 808b of the legs 808.

The legs 808 are freely slidable within the vertical pipes 806b and the holes 831a of the guides 831, and the shaft 810 is freely rotatable within the horizontal pipe 806a.

FIG. 18 is a side view of the device shown in FIG. 17. The headrest 801 is brought down by rotation around the shaft 810 in a direction indicated by an arrow mark AR18 shown in the figure. The position of the vertical pipe 806b is detected by a limit switch 817 when the headrest is brought down, and the position of the vertical pipe 806b is detected by a limit switch 816 when the headrest is brought to the original position from the brought down position (indicated by a broken line). The armrest shown in FIGS. 9 and 10 is arranged on the left-hand side of a seat. The armrest arranged on the right-hand side of the seat has a structural arrangement symmetrical to the armrest arranged on the left-hand side of the seat.

A middle-right seat has an arrangement symmetrical to the middle-left seat. Namely, the back-and-forth movement, the armrest upright position, the armrest parallel position, and the headrest action are the same for both seats, and the middle-right seat is rotated in a clockwise direction (when seen from the roof of the vehicle) to change the seat facing from a vehicle running direction to a direction opposite to the running direction.

The rear seat 120 has the same mechanisms as those of the middle seat for attaining the seat back-and-forth movement, the reclining upright position, the reclining flat position, and the headrest operation.

((Controlling Portion))

The controlling portion is now explained. The controlling portion and the operation switch for controlling a group of power seats are explained with reference to FIG. 12. The functions of motors MT(1) to MT(24) shown in the figure are as follows:

MT(1): back-and-forth movement of a middle-right seat;

MT(2): rotational movement of the middle-right seat;

MT(3): reclining movement of the middle-right seat;

MT(4): right armrest operation of the middle-right seat;

MT(5): left armrest operation of the middle-right seat;

MT(6): headrest up-and-down movement of the middle-right seat;

MT(7): headrest rotational movement of the middle-right seat;

MT(11): back-and-forth movement of a middle-left seat;

MT(12): rotational movement of the middle-left seat;

MT(13): reclining movement of the middle-left seat;

MT(14): right armrest operation of the middle-left seat;

MT(15): left armrest operation of the middle-left seat;

MT(16): headrest up-and-down movement of the middle-left seat;

MT(17): headrest rotational movement of the middle-left seat;

MT(21): back-and-forth movement of a rear seat;

MT(22): reclining movement of the rear seat;

MT(23): right headrest up-and-down movement of rear seat;

MT(24): left headrest up-and-down movement of rear seat.

The functions of the limit switches LS(11) to LS(75) are as follows:

LS(11): forward limit of the back-and-forth movement of the middle-right seat; detection of the position of the seat cushion in a fully-flat state;

LS(12): backward limit of the back-and-forth movement of the middle-right seat; detection of the position of the backward limit of the mechanism;

LS(21): right turn of the middle-right seat for facing the rear of the vehicle; detection of the position of the seat cushion at a face-to-face state;

LS(22): left turn of the middle-right seat for facing the front of the vehicle; detection of the position of the seat cushion at a front facing state;

LS(31): forward limit of the reclining movement of the middle-right seat; detection of the position of the forward reclining limit wherein the seat can be turned to take face-to-face the position without causing interference between the seat back and the interior wall of the vehicle, this limit being substantially a neutral position;

LS(32): backward limit of the reclining movement of the middle-right seat; detection of the position of the seat back in the fully-flat state;

LS(41): upper limit of the right armrest movement of the middle-right seat; detection of the position of the right armrest in the fully-flat state in which the armrest takes parallel position with respect to the seat back;

LS(42): lower limit of the right armrest movement of the middle-right seat; detection of the position of the right armrest in use in which the armrest takes an upright position with respect to the seat back;

LS(51): upper limit of the left armrest movement of the middle-right seat; detection of the position of the left armrest in the fully-flat state in which the armrest takes a parallel position with respect to the seat back;

LS(52): lower limit of the left armrest movement of the middle-right seat; detection of the position of the left armrest in use in which the armrest takes an upright position with respect to the seat back;

LS(61): upper limit of the rotational movement of the headrest of the middle-right seat; detection of position of the rotatable height of the headrest;

LS(62): upper limit of the up-and-down movement of the headrest of the middle-right seat; detection of the upper limit position of the headrest in normal use:

LS(63): lower limit of the up-and-down movement of the headrest of the middle-right seat; detection of the lower limit position of the headrest in normal use;

LS(71): forward limit of the rotational movement of the headrest of the middle-right seat; detection of the rotational position of the headrest in normal use;

LS(72): backward limit of the rotational movement of the headrest of the middle-right seat; detection of the rotational position of the headrest in fully-flat state;

LS(14): forward limit of the back-and-forth movement of the middle-left seat; detection of the position of the seat cushion in the fully-flat state;

LS(15): backward limit of the back-and-forth movement of the middle-left seat; detection of the position of the backward limit of the mechanism;

LS(24): left turn of the middle-left seat for facing the rear of the vehicle; detection of the position of the seat cushion at the face-to-face state;

LS(25): right turn of the middle-left seat for facing the front of the vehicle; detection of the position of the seat cushion at the front facing state;

LS(34): forward limit of the reclining movement of the middle-left seat; detection of the position of the forward reclining limit wherein the seat can be turned to take the face-to-face position without causing interference between the seat back and the interior wall of the vehicle, this limit being substantially a neutral position;

LS(35): backward limit of the reclining movement of the middle-left seat; detection of the position of the seat back in the fully-flat state;

LS(44): upper limit of the right armrest movement of the middle-left seat; detection of the position of the right armrest in the fully-flat state in which the armrest takes the parallel position with respect to the seat back;

LS(45): lower movement of the right armrest movement of the middle-left seat; detection of the position of the right armrest in use in which the armrest takes the upright position with respect to the seat back;

LS(54): upper limit of the left armrest movement of the middle-left seat; detection of the position of the left armrest in the fully-flat state in which the armrest takes the parallel position with respect to the seat back;

LS(55): lower limit of the left armrest movement of the middle-left seat; detection of the position of the left armrest in use in which the armrest takes the upright position with respect to the seat back;

LS(64): upper limit of the rotational movement of the headrest of the middle-left seat; detection of the position of the rotatable height of the headrest;

LS(65): upper limit of the up-and-down movement of the headrest of the middle-left seat; detection of the upper limit position of the headrest in normal use;

LS(66): lower limit of the up-and-down movement of the headrest of the middle-left seat; detection of the lower limit position of the headrest in normal use;

LS(74): forward limit of the rotational movement of the headrest of the middle-left seat; detection of the rotational position of the headrest in normal use;

LS(75): backward limit of the rotational movement of the headrest of the middle-left seat; detection of the rotational position of the headrest in the fully-flat state;

LS(17): forward limit of the back-and-forth movement of the rear seat; detection of the position of the seat cushion in the fully-flat state;

LS(18): backward limit of the back-and-forth movement of the rear seat; detection of the position of the backward limit of the mechanism;

LS(27): forward limit of the reclining movement of the rear seat; detection of the neutral position in normal use;

LS(28): backward limit of the reclining movement of the rear seat; detection of the position of the seat back in fully-flat state;

LS(37): upper limit of the right headrest of the rear seat; detection of the upper limit position in normal use;

LS(38): lower limit of the right headrest of the rear seat; detection of the lower limit position in normal use;

LS(47): upper limit of the left headrest of the rear seat; detection of the upper limit position in normal use;

LS(48): lower limit of the left headrest of the rear seat; detection of the lower limit position in normal use.

((Operation Controlled By the Controlling Portion))

Various operations can be achieved by controlling each of the driving motors and each of the limit switches having the constructions mentioned above. The manual operations for a middle-left seat or a middle-right seat are; back-and-forth movement of the seat, rotational movement of the seat, an upright position in reclining movement, a flat position in reclining movement, up-and-down movement of the headrest, upright position of the armrest, and flat position of the armrest. The manual operations for a rear seat are; back-and-forth movement of the seat, an upright position in reclining movement, a flat position in reclining movement, and movement of the right and left headrests.

Figure 20:
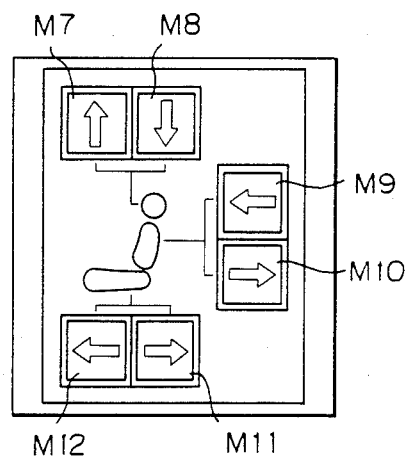
FIG. 20 shows an example of a manual switch for a rear seat.

In actual use, it is considered sufficient to provide for both the middle-left and the middle-right seats and the rear seat, back-and-forth movement of the seats, back-and-forth movement in reclining, and up-and-down movement of the headrests. In the preferred embodiment, therefore, manual switches which can control the above mentioned movements are provided at the armrests of the middle-left and the middle-right seats and on the interior walls beside the right-hand and the left-hand sides of the rear seat, respectively (FIG. 19). The manual switch SW2(1) for the middle-right and the middle-left seats has already been explained with reference to FIGS. 15 and 16. The manual switch SW2(2) for the rear seat is shown in FIG. 20.

The operation of the manual switch SW2(1) is now explained as follows with reference to FIG. 16, in which M1 to M6 represent switches, all of which are momentary-type push switches. When the switch M1 is turned ON, the seat back reclines forward. When the switch M2 is turned ON, the seat back reclines backward. When the switch M3 is turned ON, the seat moves forward. When the switch M4 is turned ON, the seat moves backward. When the switch M5 is turned ON, the headrest goes up. When the switch M6 is turned ON, the headrest goes down. Since all of these switches are momentary type, these movements occur only while the switches are depressed.

The operation of the manual switch SW2(2) is now explained with reference to FIG. 20, in which M7 to M12 represent momentary-type push switches. When the switch M7 is turned ON, the headrest goes up. When the switch M8 is turned ON, the headrest goes down. When the switch M9 is turned ON, the seat back reclines forward. When the switch M10 is turned ON, the seat back reclines backward. When the switch 11 is turned ON, the seat moves backward. When the switch 12 is turned ON, the seat moves forward. Since all of these switches are momentary type, these movements occur only while the switches are depressed.

The manual switches SW2(1) are provided for the middle-right and the middle-left seats respectively, and can be independently adjusted. Individual switches, however, operate on a priority basis so that only one movement is carried out for one seat at one time.

The manual switches SW2(2) are provided on the interior walls of the vehicle beside the right rear seat and the left rear seat. The right switch controls the right rear seat, and the left switch controls the left rear seat. In the embodiment, however, the seat cushions and seat backs of the right rear seat and the left rear seat are formed as one body, and thus only the up-and-down movement of the headrests can be separately adjusted. These movements are controlled on a priority basis so that the right and the left headrests can be simultaneously controlled, but other movements cannot be controlled at the same time. None of the manual switches are operative during automatic operation.

As mentioned above, the manual switch SW2 can adjust each portion of the seat to an optional position within the limit of each of the limit switches, according to the requirements of the passenger.

The manual switch SW2 is always operative except when the seat is in a fully-flat state. In a fully-flat state, the circuit is so constituted that the back-and-forth movement of the seat cushion and the movement of the headrest for the middle seats, and the movement of the headrest and the back-and-forth movement of the seat cushion for the rear seat, will not be actuated even if the switches are operated, since these movements will cause damage if actuated during the fully-flat state.

The automatic operation is now explained. Many kinds of automatic switches can be considered, because there are many portions to be driven. For instance, such operations as setting all seats to a fully-flat state, setting only a selected seat to a fully-flat state, setting both the middle-right and the middle-left seats to a face-to-face state, setting only one of the middle seats to a face-to-face state, setting an optional seat to a fully-flat state or to a face-to-face state, returning all seats to their original positions, etc., can be considered as actions to be controlled by the automatic operation switch.

Figure 21:
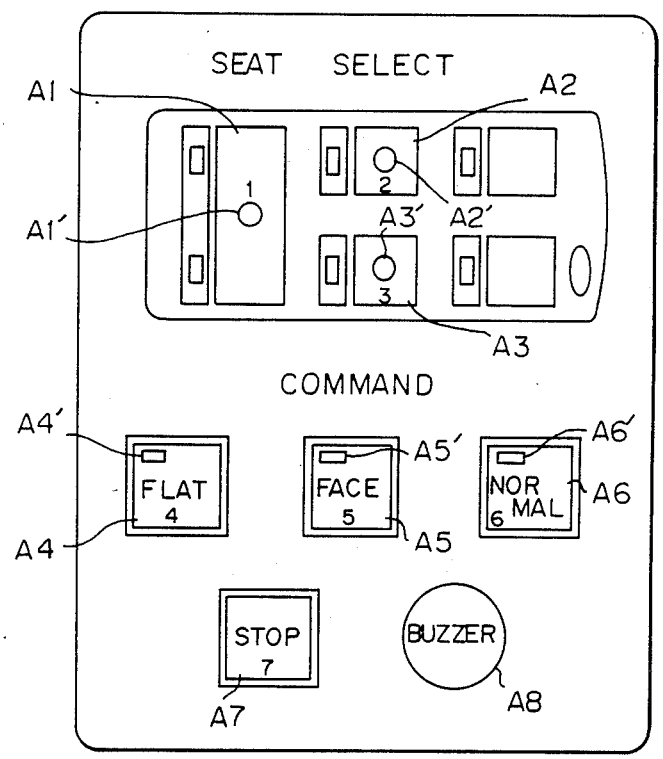
FIG. 21 shows an example of an automatic operation switch.

FIG. 21 shows an automatic operation switch SW1 as a concrete example of the automatic switch which can control the actions mentioned above. As mentioned before, the automatic operation switch SW1 of the embodiment is fitted to the position illustrated in FIG. 19.

The operation of the automatic operation switch SW1 is now explained with reference to FIG. 21, in which A1 to A7 represent switches, all of which are momentary-type push switches, A1' to A6' represent light emitting diodes, and A8 represents a buzzer. In a plan view of a vehicle shown in FIG. 21, the switch A1 controls the seat cushion of a rear seat, the switch A2 controls the seat cushion of a middle-left seat, and the switch A3 controls a middle-right seat. The switch A4 outputs a flattening instruction, the switch A5 outputs a face-to-face instruction, the switch A6 outputs a face front instruction, and the switch A7 outputs an operation stop instruction. The light emitting diodes A1' to A6' emit light when the corresponding switches A1 to A6 are depressed. Since the switches A1 to A3 are momentary type, the light emitting diodes fitted to these switches via flip-flop circuits continue to emit light once they are depressed until they are again depressed. In detail, the switches A1 to A3 are seat selection switches. If the selection switches A1 to A3 are depressed, the diodes A1' to A3' emit light, and seats are selected. The switches A4 to A6 are for selecting the movements of the seats. After selecting a seat by operating one of the switches A1 to A3, the switches A4 to A6 are operated to automatically move the seat. If the switches A4 to A6 are operated before selecting a seat by one of the switches A1 to A3, namely, where none of the diodes A1' to A3' are lit, i.e., ON, the seat will not be actuated. One of the light emitting diodes A4' to A6' will emit light when one of the switches A4 to A6 is pushed down, will continue to emit light during automatic operation of the seat, and go out, i.e., OFF, when automatic operation is stopped. When one of the light emitting diodes A4' to A6' is ON, the buzzer A8 generates a continuous sound so that an operator is made aware, not only visually but also acoustically, that automatic operation is in progress. The switch A7 is an emergency stop switch used to stop the movement of the seat during automatic operation. If the switch A7 is pushed down, movement of the seat stops instantaneously, the light emitting diodes A1' to A6' go OFF, and the buzzer is silenced so that the operator is aware that automatic operation has ceased. The automatic operation is restarted according to the operational sequence mentioned above. Automatic operation cannot be actuated during the operation controlled by a manual switch. As explained above, automatic operation is selected by one of the automatic operation switches, and a signal is transmitted to the controlling portion. The controlling portion controls each motor by using an input signal from each limit switch, wherein the operational sequence, which is important, is determined. The operational sequence is determined in such a manner that a seat in operation will not interfere with other operations. Namely, in this operational sequence, it is decided that any operations can be carried out if they follow certain conditions. These conditions are as follows:

(1) The middle seats can be rotated only one by one, or both together in synchronous motion so that they do not interfere with each other.

(2) The middle seats can be rotated only when their seat backs are in the upright reclining position.

(3) The middle seats can be rotated only when there is no interference with the seat cushions.

(4) The headrests of the middle-left and the middle-right seats and of the rear seat can be operated to be stored or positioned to a normal position only when the headrests are in a reclining positions which will not cause interference.

(5) The middle-right and the middle-left seats and the rear seat can be set to fully-flat positions or returned to the original positions only when the seats are in the fore-and-aft positions.

(6) The middle-right and the middle-left seats and the rear seat can be moved backward only after their seat backs are brought to the upright reclining positions.

(7) The middle seats can be set to the fully-flat position or returned to the original position only when the rear seat is in a rear limit position, or after the rear seat is moved backward to a position where the reclining movement of the middle seats will not interfere with the rear seat.

If the above conditions are observed in the operation of the motors, the seats will not interfere with each other to cause a stoppage of operation during automatic operation.

The operation must be carried out according to the constitution mentioned above.

In manual operation, the circuits are assembled according to the conditions mentioned above. There are three kinds of manual operations for both the middle-right and the middle-left seats and for the rear seat, these three operations including up-and-down operation of the headrests, back-and-forth operation of the seats, and back-and-forth reclining operation of the seat backs. As an example, operation of the middle-left seat is explained. When the switch M1 or M2 shown in FIG. 16 is depressed, the reclining movement of the seat is adjusted via the controlling portion. As shown in FIG. 7, the controlling portion actuates the motor 233 to provide a back-and-forth movement for the seat back frame 231. This back-and-forth movement is limited within a range defined by the limit switches 234 and 345.

The back-and-forth positioning of a seat can be adjusted by depressing the switch M3 or M4. In FIG. 4(A), the controlling portion actuates the motor 216 for the back-and-forth movement to move the rack 217 so that the seat cushion 110a fitted to the right rail 213 and the left rail 214 can be moved backward or forward. This backward movement or forward movement is limited within a range defined by the limit switches 221 and 220.

The up-and-down position of a headrest can be adjusted by depressing the switch M5 or M6. In FIGS. 17 and 18, the controlling portion actuates the second compact motor 803 to rotate the shaft 810 via the worm gear 809 and the worm wheel 811. Because the pinions 810a of the shaft 810 are engaged with the ladder racks 808b of the legs 808, the legs 808 are moved up and down according to the rotation of the shaft 810. This up-and-down movement is carried out within the limit defined by the limit switches 814 and 815 so that the shaft 810 is not pulled out of the holes 831a of the guides 831.

As mentioned above, portions of the middle-left seat can be adjusted by means of the manual switch to suit the requirements of the passenger. The middle-right seat and rear seat can be adjusted in the same manner as explained above.

An automatic operation is now explained. The operating methods and the operation of the automatic operations have been already explained with reference to the mechanism of the operation. As there are many kinds of operation, examples in which all seats are set to fully-flat positions and to face-to-face positions are explained hereunder.

Figure 13B:
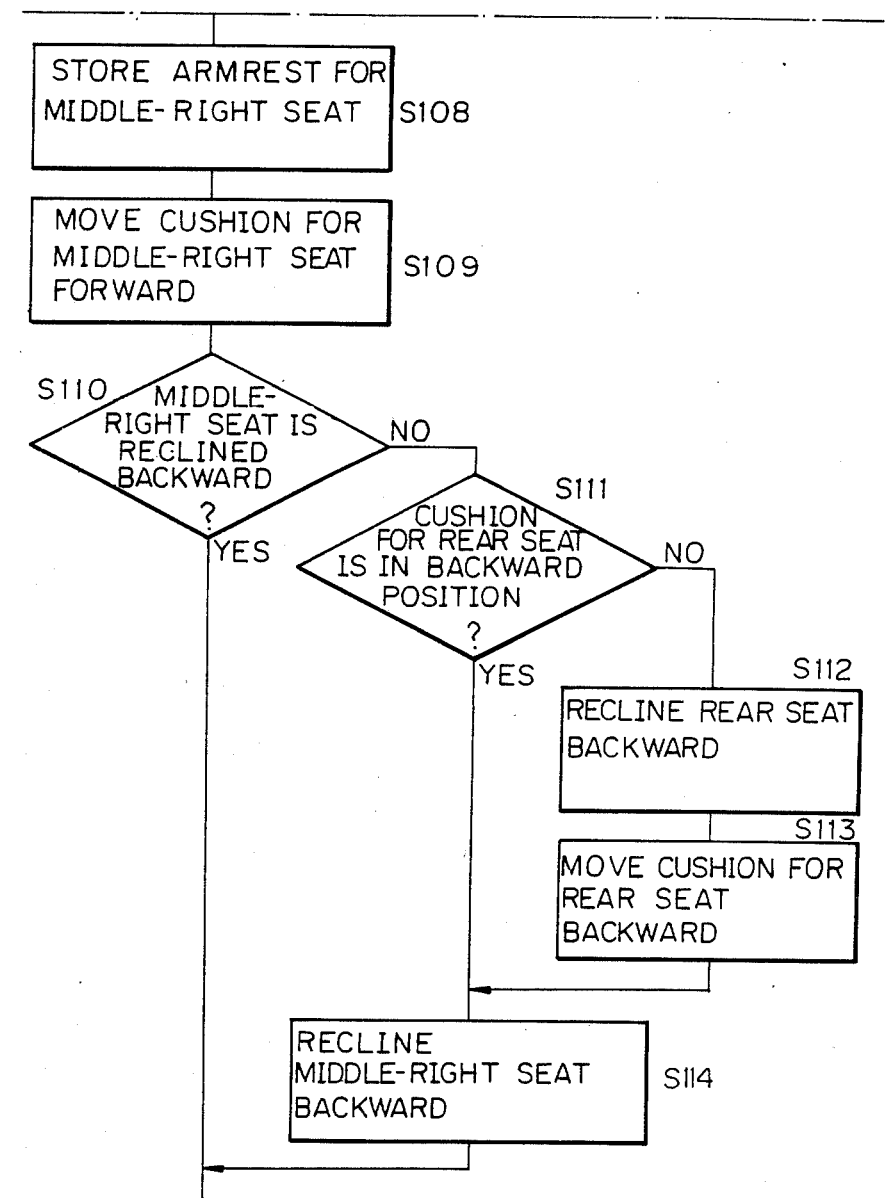
Figure 13D:
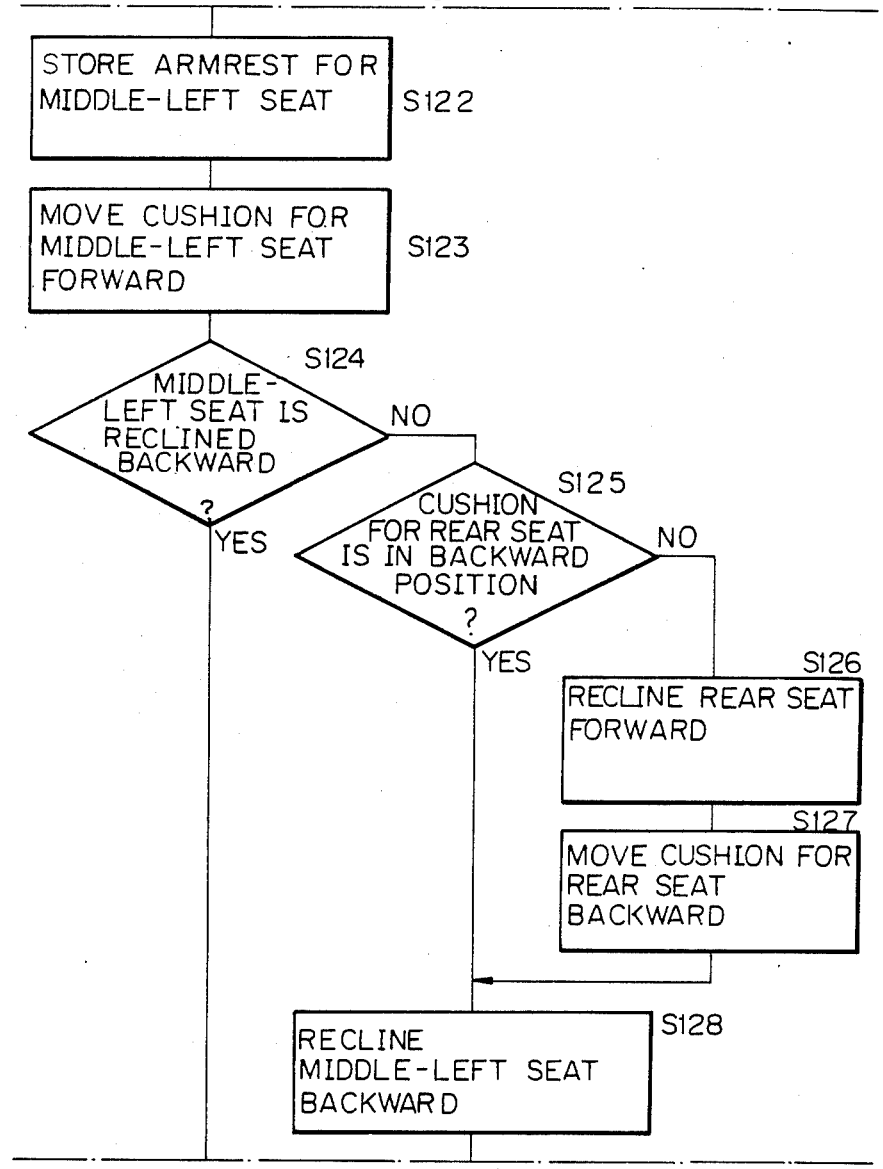
Figure 13E:
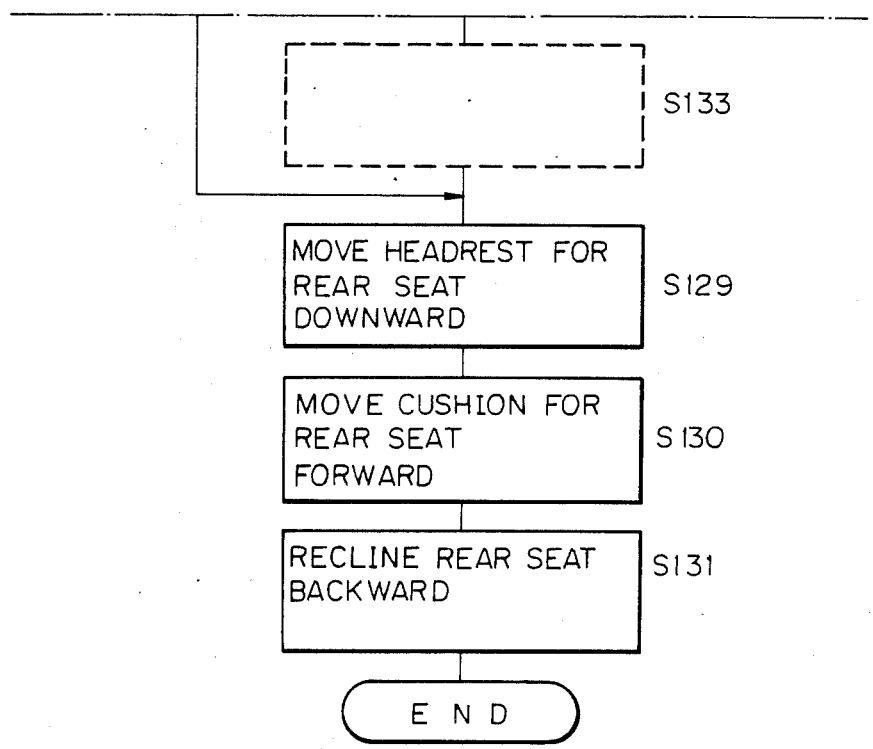
Figure 14B:
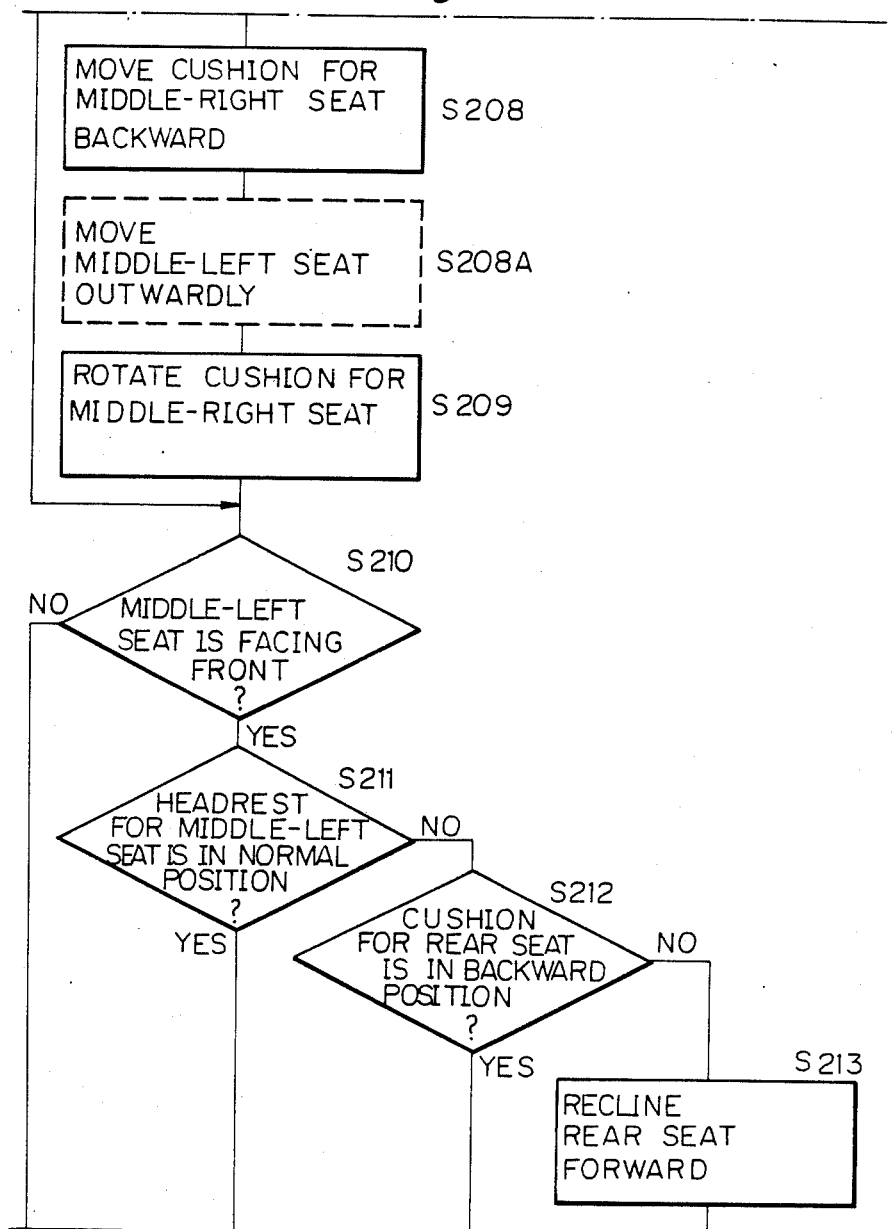
Figure 14C:
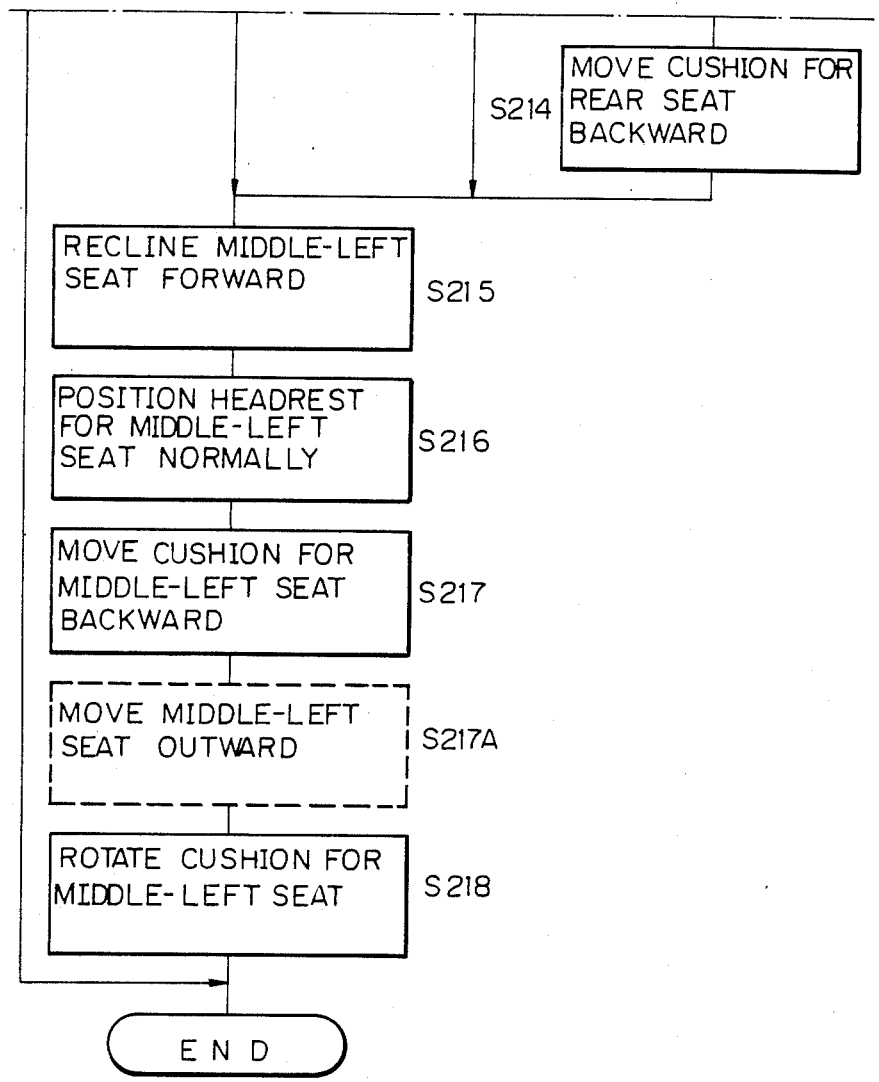

FIG. 13 is a flow chart of the operation for setting all the seats to the fully-flat position, and FIG. 14 is a flow chart of the operation for setting the middle-right and middle-left seats to the face-to-face position. The details of the control, e.g., number of a motor and a number of a limit switch, are not shown in the flow chart, as only the schematic flow of the control is shown. Since the circuits according to the flow chart can be easily made based on the prior art, a detailed explanation of the circuits will be omitted. In FIGS. 13 and 14, operation steps having a question mark "?" denote alternative judging steps for judging a state of each limit switch. Operation steps not having question marks denote movement steps in which each motor is activated until each limit switch is turned ON.

((Operation for Setting All Seats to Fully-flat State Shown in FIG. 13))

Figure 12:
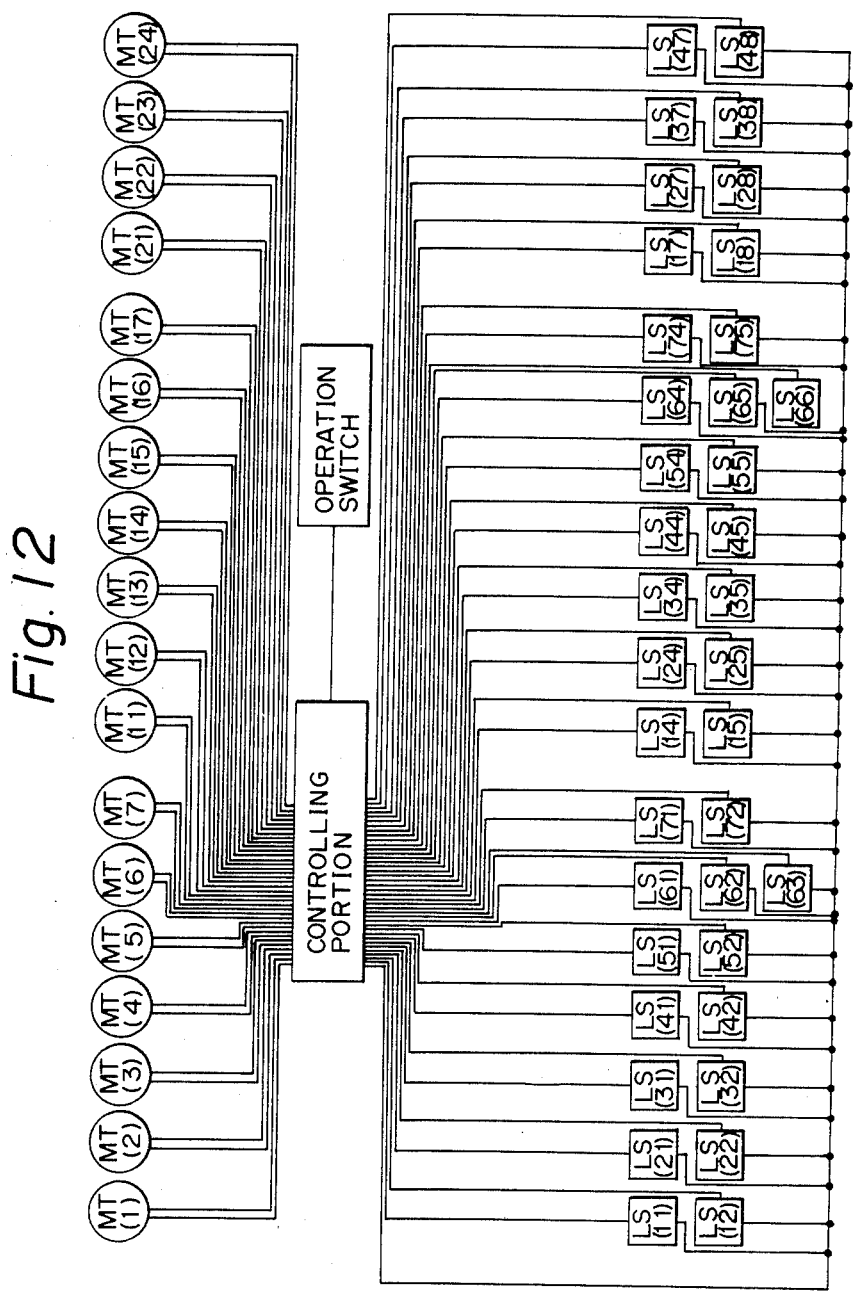
FIG. 12 is a system diagram of a controlling portion and an operation switching portion included in the device shown in FIG 1.

The operation for setting all seats to the fully-flat position is explained with reference to FIGS. 12 and 13. Parts which are shown in structural drawings are denoted by their names and reference number in the drawings.

In the automatic switch SW1 (FIG. 21), switches A1, A2, and A3 are depressed to select all seats. Light emitting diodes A1', A2', and A3' are lit. Then, the switch A4 is depressed. As soon as the switch A4 is depressed, the light emitting diode A4' is lit, and the buzzer A8 generates sound. These signals are transferred to the controlling portion to control all seats to be set to fully-flat position according to predetermined conditions. The flow chart of the controlling portion is shown in FIG. 13. Details of the above are explained as follows.

First, the middle-right seat is to be set to the fully-flat state.

At step S101, it is determined whether the middle-right seat is in a front-facing state or in a face-to-face state. If the limit switch LS(22) is ON, the seat is in a front-facing state, and if the limit switch LS(21) is ON, the seat is in a face-to-face state. The operation proceeds to YES if the seat is in a front-facing state, and to NO if the seat is in a face-to-face state.

At steps S102 to S104, the middle-right seat is returned to a front-facing state, because the middle-right seat is in a face-to-face state (condition (1)).

At step S102, the reclining motor MT(3) is actuated to raise the seat back until the limit switch LS(31) is turned ON (condition (2)).

At step S103, the motor MT(1) for the back-and-forth movement of the seat is actuated to move the seat backward until the limit switch LS(12) is turned ON (condition (3)).

At step S104, the motor MT(2) for the rotational movement of the seat is actuated to rotate the seat in the left direction until the limit switch LS(22) is turned ON. As a result, the middle-right seat is brought to the front-facing position.

At step S105, it is determined whether the headrest of the middle-right seat is in a normal state or in a stored state. If the limit switch LS(71) (the limit switch 816 in FIG. 18) is ON, the headrest is in a normal state, whereas, if the limit switch LS(72) (the limit switch 817 in FIG. 18) is ON, the headrest is in a stored state. The operation proceeds to YES if it is in a stored state, and to NO if it is in a normal state.

At step S106, to store the headrest, the reclining motor MT(3) is actuated to raise the seat back until the limit switch LS(31) is turned ON (condition (4)). Naturally, the motor MT(3) is actuated only when the operation has proceeded to YES from the step S101.

At step S107, the headrest is stored. First, the motor MT(6) (second compact motor 806 in FIG. 17) for the up-and-down movement of the headrest is actuated to move the legs 808 upward until the legs 808 slip completely out of the holes 831a of the guides 831 shown in FIG. 17. When the limit switch LS(61) (limit switch 813 in FIG. 17) detects that the legs 808 are completely raised, the motor MT(6) is stopped, and the other MT(7) (first compact motor 802 in FIG. 17) for rotating the headrest is energized. When the motor MT(7) starts to rotate, the headrest starts to rotate according to the rotation of the hollow pipe 806 and continues the rotation until the limit switch LS(72) (limit switch 817 in FIG. 18) is turned ON.

At step S108, the armrest of the middle-right seat is stored. The motors MT(4) and MT(5) are simultaneously actuated and kept energized until the limit switches LS(41) and LS(51) are turned ON to store the armrest.

At step S109, the motor MT(1) of the middle-right seat is operated to send the seat cushion forward until the limit switch LS(11) is turned ON (condition (5)).

At step S110, it is determined whether the middle-right seat is in a fully-flat state or not. If the limit switch LS(32) is ON, the seat is in a fully-flat state, and if OFF, the seat is not in a fully-flat state. The operation proceeds to YES if the seat is in a fully-flat state, and to NO if it is not in a fully-flat state.

At step S111, it is determined whether or not the cushion of the rear seat is in a rear position. The cushion is in the rear position if the limit switch LS(18) is ON. If the cushion is in the rear position, the operation proceeds to YES, if not, it proceeds to NO (condition (7)).

At step S112, the motor MT(22) of the rear seat is actuated to recline the seat back forward until the limit switch LS(27) is turned ON (condition (6)).

At step 113, the motor MT(21) of the rear seat is actuated to send the seat cushion backward until the limit switch LS(18) is turned ON.

At step 114, the motor MT(3) of the middle-right seat is operated to recline the seat back backward until the limit switch LS(32) is turned ON.

By the above mentioned operations, the middle-right seat is brought to a fully-flat state. If the middle-right seat is already in a fully-flat state, the operation proceeds to YES at each of steps S101, S105, and S110, and as a result, the seat does not move.

Then, the middle-left seat is brought to a fully-flat state. The operations here are the same as those of steps S101 to S114.

At step S115, it is determined whether the middle-left seat is in a front-facing state or in a face-to-face state. If the limit switch LS(25) (limit switch 218 in FIG. 4A) is ON, the seat is in a front-facing state, and if the limit switch LS(24) (limit switch 219 in FIG. 4A) is ON, the seat is in a face-to-face state. The operation proceeds to YES if the seat is in a front-facing state, and to NO if the seat is in a face-to-face state.

At steps S116 to S118, the seat is returned to a front-facing state, because the seat is in a face-to-face state.

At step S116, the reclining motor MT(13) (Motor 233 in FIG. 7) is actuated to raise the seat back until the limit switch LS(34) (limit switch 235 in FIG. 8) is turned ON (condition (2)).

At step S117, the motor MT(11) (motor 216 in FIG. 4A) for the back-and-forth movement of the seat is actuated to move the seat backward until the limit switch LS(15) (limit switch 220 in FIG. 4A) is turned ON (condition (3)).

At step S118, the motor MT(12) (motor 215 in FIG. 4A) for the rotational movement of the seat is actuated to rotate the seat to the right until the limit switch LS(25) (limit switch 218 in FIG. 4A) is turned ON. As a result, the middle-left seat is brought to the front-facing position.

At step S119, it is determined whether the headrest of the middle-left seat is in a normal state or in a stored state. If the limit switch LS(74) is ON, the headrest is in a normal state, whereas if the limit switch LS(75) is ON, the headrest is in a stored state. The operation proceeds to YES if the headrest is in a stored state, and to NO if it is in a normal state.

At step S120, to store the headrest, the reclining motor MT(13) (motor 233 in FIG. 7) is actuated to raise the seat back until the limit switch LS(34) (limit switch 235 in FIG. 8) is turned ON (condition (4)). Naturally, the motor MT(13) is actuated only when the operation has proceeded to YES from step S115.

At step S121, the headrest is stored. First, the motor MT(16) for the up-and-down movement of the headrest is actuated to move the headrest upward until the limit switch LS(64) is turned ON. When the limit switch LS(64) is turned ON, the motor MT(16) is stopped, and the motor MT(17) is energized to rotate the headrest until the limit switch LS(75) is turned ON. When the limit switch LS(75) is turned ON, the motor MT(17) is stopped.

At step S122, the armrest of the middle-left seat is stored. The motors MT(14) and MT(15) (motor 438 in FIG. 10) are simultaneously actuated and kept energized until the limit switches LS(44) and LS(54) (limit switch 447 in FIG. 10) are turned ON to store the armrest.

At step S123, the motor MT(11) (motor 216 in FIG. 4A) of the middle-left seat is operated to send the seat cushion forward until the limit switch LS(14) (the limit switch 221 in FIG. 4A) is turned ON (condition (5)).

At step S124, it is judged whether or not the middle-left seat is in a fully-flat state. If the limit switch LS(35) (limit switch 234 in FIG. 8) is ON, the seat is in a fully-flat state, and if OFF, the seat is not in a fully-flat state. The operation proceeds to YES if the seat is in a fully-flat state, and to NO if it is not in a fully-flat state.

At step S125, it is determined whether or not the cushion of the rear seat is in a rear position. The cushion is in the rear position if the limit switch LS(18) is ON. If the cushion is in the rear position, the operation proceeds to YES, if not, it proceeds to NO (condition (7)). The operation proceeds to NO only when it has been proceeded to YES from step S110.

At step S126, the motor MT(22) of the rear seat is actuated to recline the seat back forward until the limit switch LS(27) is turned ON (condition (6)).

At step 127, the motor MT(21) of the rear seat is actuated to send the seat cushion backward until the limit switch LS(18) is turned ON.

At step 128, the motor MT(13) (the motor 233 in FIG. 7) of the middle-left seat is operated to recline the seat back backward until the limit switch LS(35) (the limit switch 234 in FIG. 8) is turned ON.

By the above mentioned operations, the middle-left seat is brought to a fully-flat state. If the middle-left seat is already in a fully-flat state, the operation proceeds to YES at each of steps S115, S119, and S124, and as a result, the seat does not move.

Finally, the rear seat is brought to a fully-flat state.

At step S129, the motors MT(23) and MT(24) of the rear seat are actuated to lower the headrest until the limit switches LS(38) and LS(48) are turned ON.

At step 130, the motor MT(21) of the rear seat is actuated to send the seat forward until the limit switch LS(17) is turned ON (condition (5)).

At step 131, the motor MT(22) of the rear seat is actuated to recline the seat back backward until the limit switch LS(28) is turned ON.

By the above mentioned operations, the rear seat is brought to a completely fully-flat position, and the light emitting diodes A1' to A3' and the buzzer A8 are turned OFF.

By controlling the operation of the seats in accordance with the seat conditions, the seats can be quickly and safely brought to the fully-flat positions.

((Face-to-face Operation of Seats Shown in FIG. 14))

FIG. 14 shows a flow chart of the operation of the controlling portion to bring the seats face-to-face. This is explained in the same manner as given for bringing the seats to a fully-flat state.

At step S201, it is determined whether or not the middle-right seat faces the front. If the result is NO, the operation proceeds to step 210, if YES, the operation proceeds to step S202.

At step S202, it is determined whether or not the headrest of the middle-right seat is in a normal state. If the result is YES, the operation proceeds to step S206, if NO, the operation proceeds to step S203.

At step S203, it is determined whether or not the seat cushion or the rear seat is in a rear position. If the result if YES, the operation proceeds to step S206, if NO, the operation proceeds to step S204.

At step S204, the seat back of the rear seat is raised in a reclining motion.

At step S205, the seat cushion of the rear seat is moved backward.

At step S206, the seat back of the middle-right seat is raised in the reclining motion.

At step S207, the headrest of the middle-right seat is returned to a normal state.

At step S208, the seat cushion of the middle-right seat is moved backward, and step S208A is skipped.

At step S209, the seat cushion of the middle-right seat is rotated.

At step S210, it is determined whether or not the middle-left seat faces the front. If the result is NO, the operation proceeds to the end of the routine, if YES, the operation proceeds to step S211.

At step S211, it is determined whether or not the headrest of the middle-left seat is in a normal state. If result is YES, the operation proceeds to step S215, if NO, the operation proceeds to step S212.

At step S212, it is determined whether or not the seat cushion of the rear seat is in a rear position. If the result is YES, the operation proceeds to step S215, if No, the operation proceeds to step S213.

At step S213, the seat back of the rear seat is raised in a reclining motion.

At step S214, the seat cushion of the rear seat is moved backward.

At step S215, the seat back of the middle-left seat is raised in reclining motion.

At step S216, the headrest of the middle-left seat is returned to a normal state.

At step S217, the seat cushion of the middle-left seat is moved backward, step S217A is skipped.

At step S218, the seat cushion of the middle-left seat is rotated to complete the routine.

((Supplemental Description))

Although two embodiments have been explained above, other automatic operations will be performed in the same manner as those of the embodiments.

In operating other automatic mechanisms, it is necessary only to fulfill the above mentioned conditions for constituting the circuits of the mechanisms.

The basic item of the control of the device shown in FIG. 1 is to operate power seats based on signals transmitted from the mechanism operating state sensors and the operation switches according to a predetermined sequence so that the seats are brought to a selected operational state. To achieve this control, it will be understood that the controlling portion can have several aspects, as follows:

(1) When rotating a power seat having a face-to-face function, the controlling portion rotates the power seat after the other power seat is placed in a position in which the rotation of the power seat does not interfere with the existence of the other power seat.

(2) When rotating power seats having face-to-face functions, the controlling portion does not rotate two power seats simultaneously but rotates the power seats one by one.

(3) When rotating a power seat having a face-to-face function, the controlling portion rotates the power seat after raising the seat back of the power seat so that the seat does not interfere with other portions of the vehicle interior due to the rotation.

(4) When rotating a power seat having a face-to-face function, the controlling portion rotates the power seat after moving the seat cushion of the seat to a position in which the seat will not interfere with other portions of the vehicle interior due to the rotation.

(5) When storing the headrest of a power seat having a function to store the headrest to take a fully-flat position, or when returning the same to a normal position, the controlling portion moves the headrest when the reclining position of the seat back of the power seat will not interfere with the motion of the headrest.

(6) When bringing a power seat having a fully-flat function to a fully-flat position or to an original position, the controlling portion performs the reclining motion of the power seat when no seat cushions are positioned to interfere with the seat back to be reclined.

(7) When bringing a power seat having a fully-flat function to a fully-flat position or to an original position, the controlling portion performs the reclining motion of the power seat after moving a seat cushion located on the rear side of the power seat to be operated backward so that the reclining motion will not interfere with anything.

(8) When moving a power seat backward, the controlling portion performs the operation after raising the reclined seat back of the power seat to a position in which the seat back will not interfere with anything due to the operation.

(9) The controlling portion has a function to indicate by sound or light the operation of a power seat when the power seat is under automatic operation.

Many modifications will be possible to achieve the purpose of the present invention. For example, the construction of a power seat is not limited to those explained with reference to the embodiments, but other constructions may be possible. Further, the sequence of the flow chart of the controlling portion can be changed if the conditions are observed.

For example, in FIG. 13, step S108 "STORE ARMREST FOR MIDDLE-RIGHT SEAT" can be changed to step S132 enclosed by a dotted line in FIG. 13, and step S122 "STORE ARMREST FOR MIDDLE-LEFT SEAT" can be changed to step S133 also enclosed by a dotted line in the figure. Although the explanation has been made in connection with the above embodiments for the wagon-type vehicle having separated middle seats, other types of seats can be adopted for the invention. Naturally, a fully-flat mechanism of a passenger car can be operated according to the same conditions as those of the present invention, because the front seats of the passenger car can be considered similar to the middle seats of the present invention, and the rear seats of the passenger car similar to the rear seats of the present invention. Although limit switches are used to detect each state of the seats in the present invention, other sensors can be also used. Further, the emergency stopping switch provided according to the present invention to instantaneously stop the operation in an emergency can be replaced with another switch.

((Embodiment Shown in FIG. 22))

Figure 22:
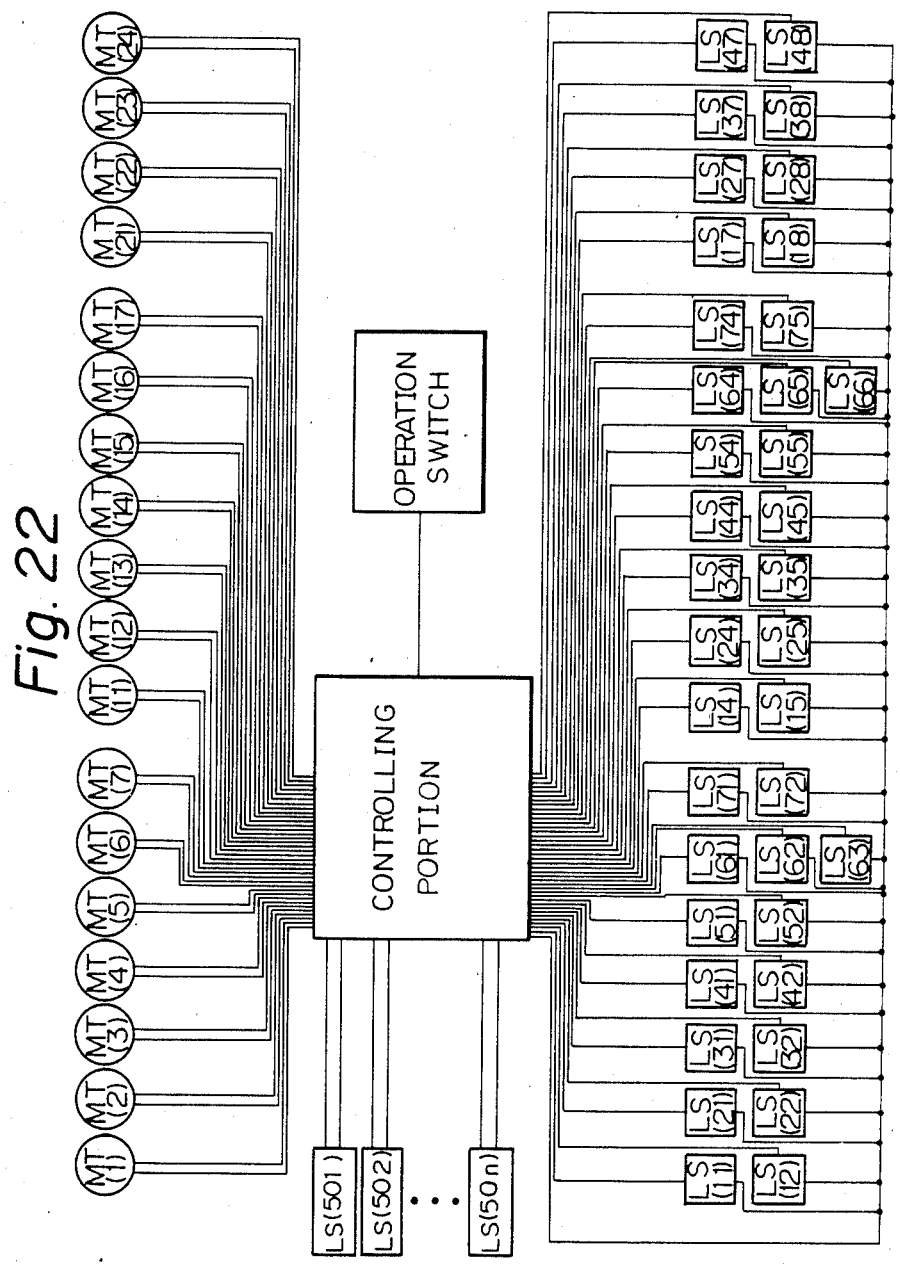
FIG. 22 is a system diagram of a controlling portion and an operation switching portion of a power seat device according to another embodiment of the present invention.

FIG. 22 is a system diagram of a controlling portion and an operation switching portion of a power seat device according to another embodiment of the present invention.

Limit switches LS(501) to LS(50n) corresponding to tape switches can be arranged in any quantity and at any place where there is possibility that a seat will collide with other objects. In the first embodiment, the limit switches are arranged around the seat cushion of a middle seat, i.e., a limit switch LS(501) for a middle-right seat, and a limit switch LS(502) for a middle-left seat.

Figure 23:
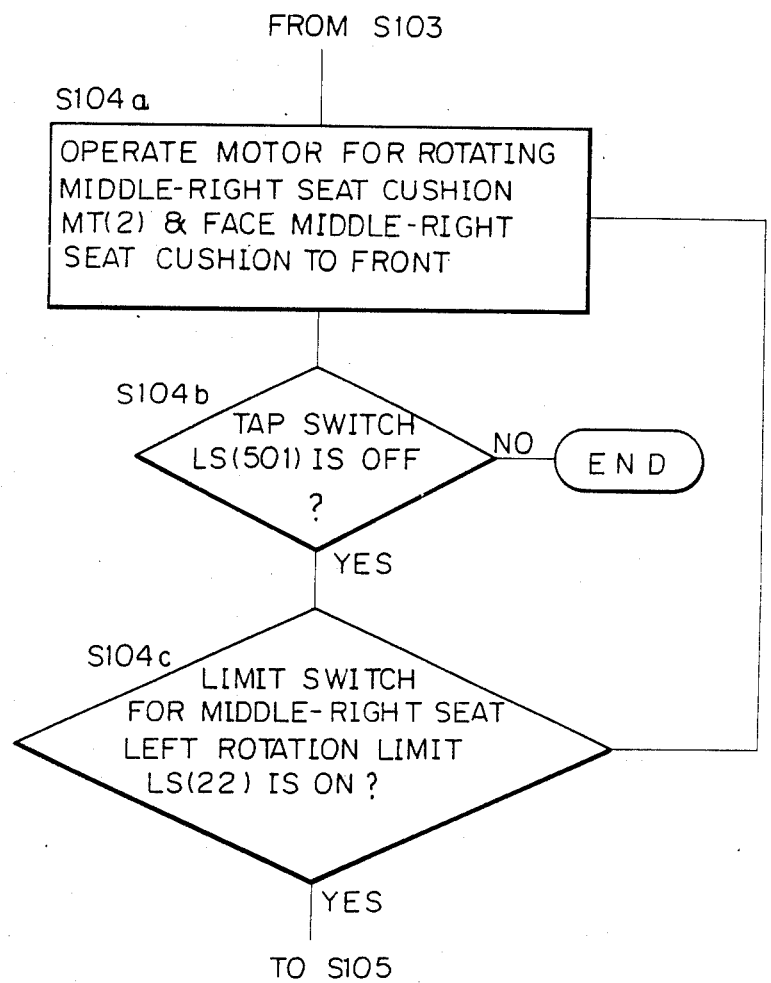
FIG. 23 is a flow chart showing the flow of operation in the system shown in FIG. 22.

FIG. 23 shows a detailed flow chart of the step 104 shown in FIG. 13 including the steps S104a, S104b, and S104c.

At step S104, the motor MT(2) for rotating the seat is actuated to rotate the seat leftward until the limit switch LS(22) is turned ON.

In this movement, the operation differs from the previously described operation, because the tape switch LS(501) is provided for the middle-right seat. The detail of the operation will be explained hereunder.

Due to the tape switch LS(501) automatic operation is stopped instantaneously whenever a person or an object is caught between the seat cushion and the interior wall, etc., of the vehicle while the middle-right seat is being rotated. Thus, the middle-right seat is brought to a front-facing state.

Referring to FIG. 13, at step S109 the motor MT(1) of the middle-right seat is actuated to send the seat forward until the limit switch LS(11) is turned ON.

Since the tape switch LS(501) is provided for the middle-right seat, the flow at step S109 is similar to that of step S104 shown in FIG. 23. Therefore, the automatic operation is stopped instantaneously whenever a person or an object is caught between the seat cushion and the interior wall, etc., of the vehicle while the middle-right seat is being moved forward.

At step S118, the motor MT(12) (motor 215 in FIG. 4) for rotating the seat is actuated to rotate the seat rightward until the limit switch LS(25) (the limit switch 218 in FIG. 4) is turned ON.

Since a tape switch LS(502) is also provided in this case for the middle-left seat, the operation for this case is similar to that shown in FIG. 23. Therefore, the automatic operation is stopped instantaneously whenever a person or an object is caught between the seat cushion and the interior wall, etc., of the vehicle while the middle-left seat is being rotated.

By the above operations, the middle-left seat is brought to a front-facing state.

At step S123, the motor MT(11) (motor 216 in FIG. 4(A)) of the middle-left seat is actuated to send the seat cushion forward until the limit switch LS(14) (limit switch 221 in FIG. 4(A)) is turned ON.

Since the tape switch LS(502) is provided for the middle-left seat, the flow at step S123 is similar to that of step S104 shown in FIG. 23. Therefore, the automatic operation is stopped instantaneously whenever a person or an object is caught between the seat cushion and the interior wall etc., of the vehicle while the middle-left seat is being moved forward.

Since the tape switches LS(501) and LS(502) are provided as mentioned above, the movement of the seat is stopped instantaneously if a person or an object is caught between the seat and the interior wall during automatic operation so that a safe and highly practical power seat operation can be realized.

Although the tape switches have been arranged only around the seat cushion in the above embodiment, the tape switches can be arranged on the back of the seat back of the middle seat, around the headrest of the middle seat, around the cushion of the rear seat, on the back of the seat back of the rear seat, and around the headrest of the rear seat so that the reclining movement of the seat back is stopped if the seat is in a fully-flat state, thereby improving the safety and the practicality of the seat operation. The flow chart for this case can be designed in the same manner as that of the embodiment mentioned above. As a sensor to detect pressure, not only the tape switch, but also a pressure sensitive conductive rubber, a limit switch, a pressure sensor, etc., can be adopted. Although automatic operation is stopped instantaneously whenever the tape switch is turned ON in the above embodiment, the seat can be returned to a desired position by rotating the motor in reverse instead of stopping the operation.

((Embodiment Shown in FIGS. 24A and 24B))

Figure 24B:
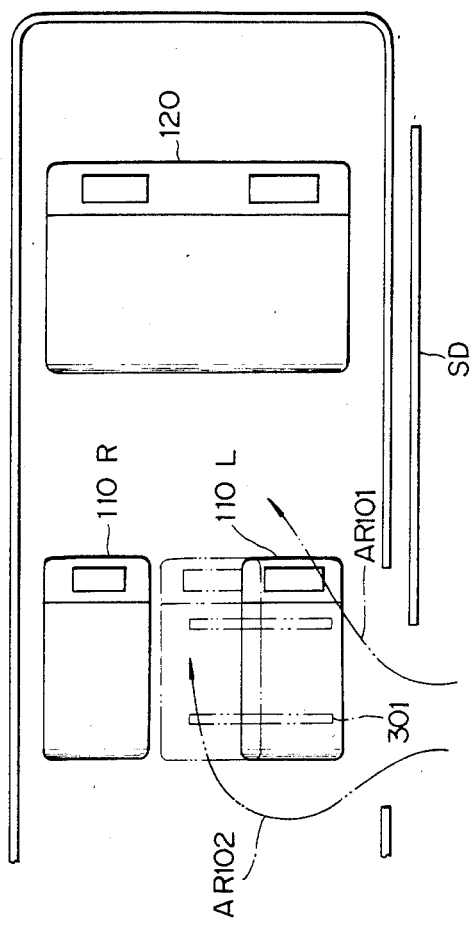

FIGS. 24A and 24B show a seating device for a vehicle according to one embodiment of the present invention. FIG. 24A is a side view of a middle seat 110 and a rear seat 120 of the vehicle, and FIG. 24B is a plan view of those seats. In the figures, 110-R represents a middle-right seat, and 110-L a middle-left seat.

Figure 26:
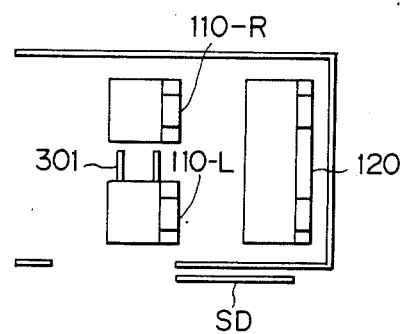
FIGS. 26 and 27 show the arrangement of the middle and rear seats of a vehicle.
Figure 27:
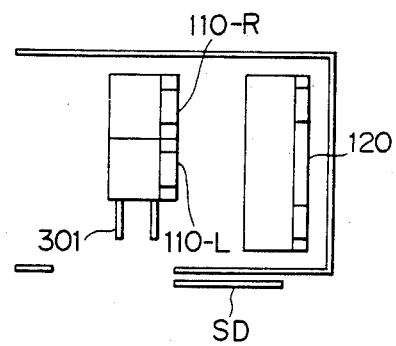

FIGS. 26 to 30 are views for explaining a seat (middle-left seat) having a transversal sliding mechanism of the seating device for the vehicle shown in FIGS. 24A and 24B. The vehicle shown in FIG. 26 is a 7-passenger type vehicle in which middle seats are separated from each other. In this vehicle, the middle-left seat (beside an entrance door) is arranged on a rail 301 fitted to the vehicle floor in such a manner that the middle-left seat can be moved transversely and connected with an adjacent seat.

Figure 28:
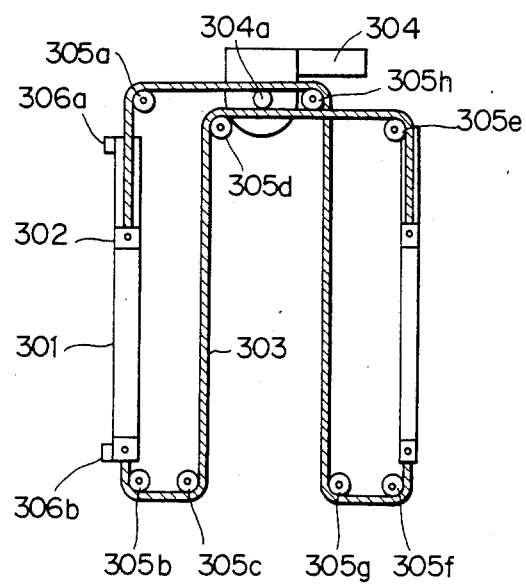
FIGS. 28, 29 and 30 show the construction of a mechanism for moving a middle-left seat.
Figure 29:
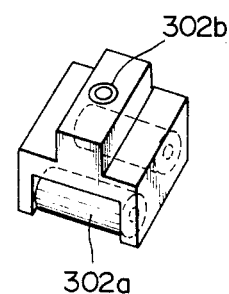
Figure 30:
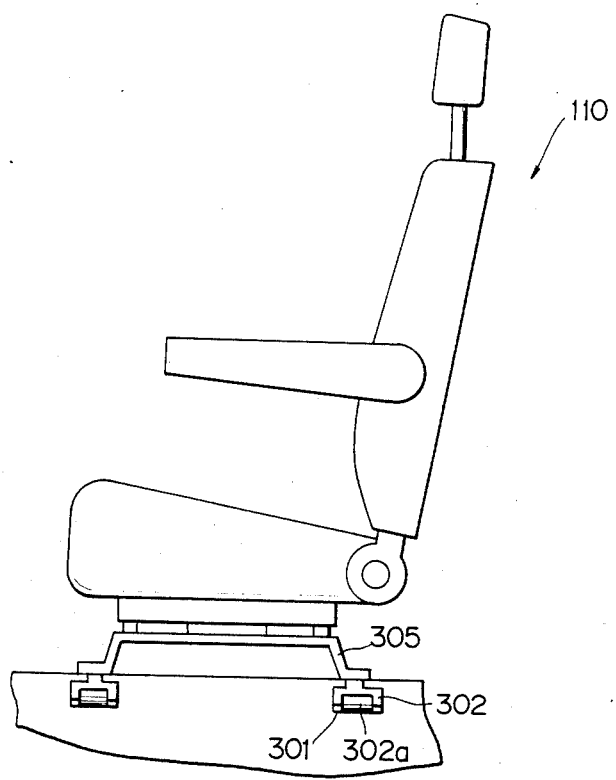

The details of the rail 301 are shown in FIGS. 28 and 29. The rail 301 is provided with a slider 302 sliding smoothly within the rail 301, a flexible driving wire 303 for driving the slider 302, a driving motor 304 for driving the driving wire 303, and pulleys 305a, 305b, 305c, 305d, 305e, 305f, 305g, and 305h, rotatable around their supporting axes, for guiding the driving wire 303. Details of the slider 302 are shown in FIGS. 29 and 30. The slider 302 is received by the rail 301 as shown in FIG. 30 and includes a freely rotatable roller 302a so that the slider 302 can move smoothly in the rail 301. A leg 305 of the seat is fixed to a threaded portion 302b of the slider 302 by a bolt (not shown). A limit switch 306a detects that the seat has moved toward the inside within the vehicle room, and a limit switch 306b detects that the seat has moved toward the outside within the vehicle room. When a driving shaft 304a of the motor 304 is rotated clockwise in FIG. 28, the seat is moved toward an upper direction in FIG. 28, and toward a lower direction if the motor is rotated anticlockwise.

The constitution and the operation of the device shown in FIGS. 24A and 24B will be explained with reference to FIGS. 2 to 14.

FIG. 2 shows a face-to-face state of the device shown in FIG. 1.

The rotational movement and the back-and-forth movement of the seat cushion of the power seat is explained hereunder. The mechanisms adopted for the power seat are shown in FIGS. 3 to 10. FIGS. 3, 4A, 4B, 5, and 7 show the middle-left seat, while FIGS. 9 and 10 showing the left armrest of the middle-left seat.

In FIGS. 24A and 24B, when a sliding door SD is opened and an automatic switch is operated for sliding the middle-left seat 110-L transversely, the controlling portion is actuated to bring the movable middle-left seat 110-L from a position enclosed by the continuous line shown in the figure to a position enclosed by a dotted line. This allows a passenger or cargo to gain access to the rear seat 120 along a path indicated by an arrow mark AR101. If the middle-left seat 110-L is operated while the seats are in a fully-flat state, a gap between the middle-left seat 110-L and the middle-right seat 110-R is closed, thereby improving the comfort and ease in getting on and off the vehicle. (In the prior art, access to the rear seat 120 by a passenger or cargo is possible only through a path between one middle seat and another middle seat as indicated by an arrow mark AR102, and thus access to the rear seat is inconvenient.)

FIG. 25 shows a system of the controlling portion and the operation switching portion of the device shown in FIGS. 24A and 24B. In the device shown in FIG. 25, the functions of limit switches LS(306a) and LS(306b) are as follows:

LS(306a): detection of the movement of the middle-left seat toward the inside within the vehicle room;

LS(306b): detection of the movement of the middle-left seat toward the outside within the vehicle room.

A transversal sliding function may be added to the basic functions. According to the sliding function, the right seat and the left seat can be connected in one body in a fully-flat state, thereby improving the convenience of use of the seats, and providing a wide entrance way. This is also convenient when access to the rear seat is needed by a passenger or in loading cargo onto the rear seat, because the rear seat can be approached along the door side of the middle seat after transversely sliding the middle seat, as shown in FIGS. 24A and 24B.

FIG. 14 shows a flow chart of the controlling portion to bring all seats (only middle-left and middle-right seats) to a face-to-face state, and is explained in the same manner as for bringing the seats to a fully-flat state.

At step S201, it is determined whether or not the middle-right seat faces front. If the result if NO, the operation proceeds to step 210, if YES, the operation proceeds to step S202.

At step S202, it is determined whether or not the headrest of the middle-right seat is in a normal state. If the result if YES, the operation proceeds to step S206, if NO, the operation proceeds to step S203.

At step S203, it is determined whether or not the seat cushion of the rear seat is in a rear position. If the result is YES, the operation proceeds to step S206, if NO, the operation proceeds to step S204.

At step S204, the seat back of the rear seat is raised in a reclining motion. At step S205, the seat cushion of the rear seat is moved backward.

At step S206, the seat back of the middle-right seat is raised in a reclining motion.

At step S207, the headrest of the middle-right seat is returned to a normal state.

At step S208, the seat cushion of the middle-right seat is moved backward.

At step S208A, the middle-left seat is moved toward the outside within the vehicle room.

At step S209, the seat cushion of the middle-right seat is rotated.

At step S210, it is determined whether or not the middle-left seat faces front. If the result is NO, the operation proceeds to the end of the routine, if YES, the operation proceeds to step S211.

At step S211, it is determined whether or not the headrest of the middle-left seat is in a normal state. If the result if YES, the operation proceeds to step S215, if NO, the operation proceeds to step S212.

At step S212, it is determined whether or not the seat cushion of the rear seat is in a rear position. If the result is YES, the operation proceeds to step S215, if NO, the operation proceeds to step S213.

At step S213, the seat back of the rear seat is raised in a reclining motion. At step S214, the seat cushion of the rear seat is moved backward.

At step S215, the seat back of the middle-left seat is raised in a reclining motion.

At step S216, the headrest of the middle-left seat is returned to a normal state.

At step S217, the seat cushion of the middle-left seat is moved backward.

At step S217A, the middle-left seat is moved toward the outside within the vehicle room.

At step S218, the seat cushion of the middle-left seat is rotated to complete the routine.

((Embodiment Shown in FIGS. 31A and 31B))

Figure 31B:
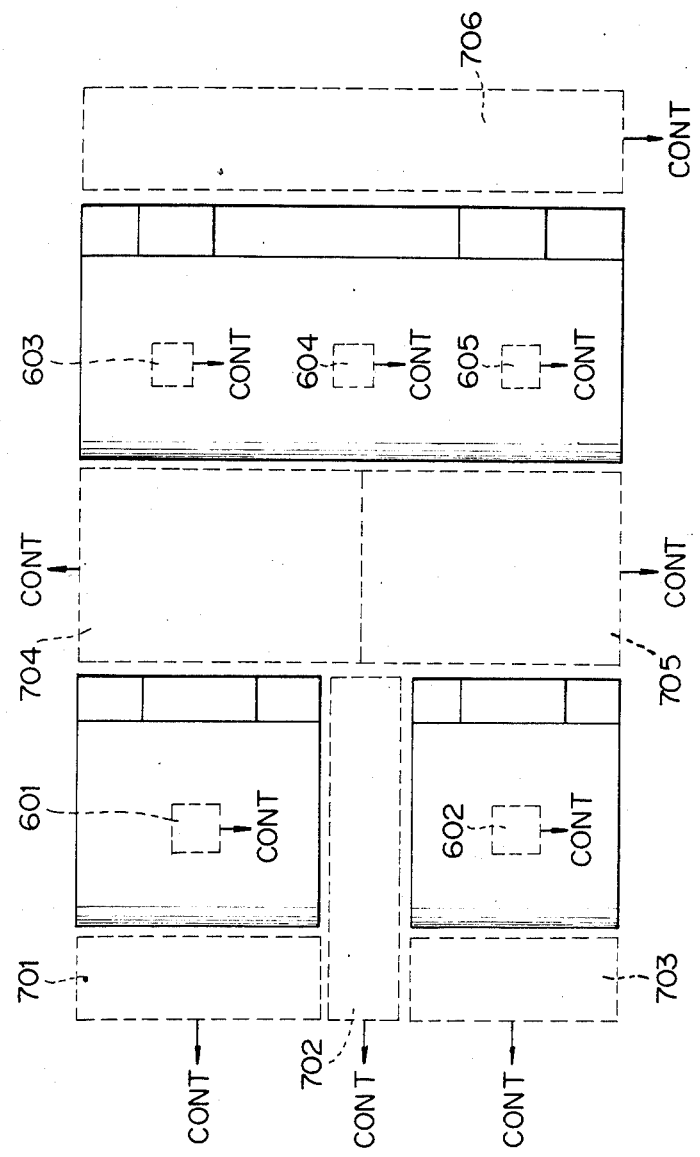

A power seat apparatus according to another embodiment of the present invention is shown in FIGS. 31A and 31B. An elevation view of the arrangement of the power seat apparatus is shown in FIG. 31A, and a plan view of the arrangement of the power seat apparatus is shown in FIG. 31B. In the apparatus shown in FIGS. 31A and 31B, weight-pressure sensors 601, 602, 603, 604, and 605, and pressure sensitive electrically conductive rubber elements 701, 702, 703, 704, 705, and 706 are provided. The pressure sensitive rubber elements 701 to 706 switch ON when a person is standing near to the power seat or an article is placed on the floor around the power seat.

Figure 32:
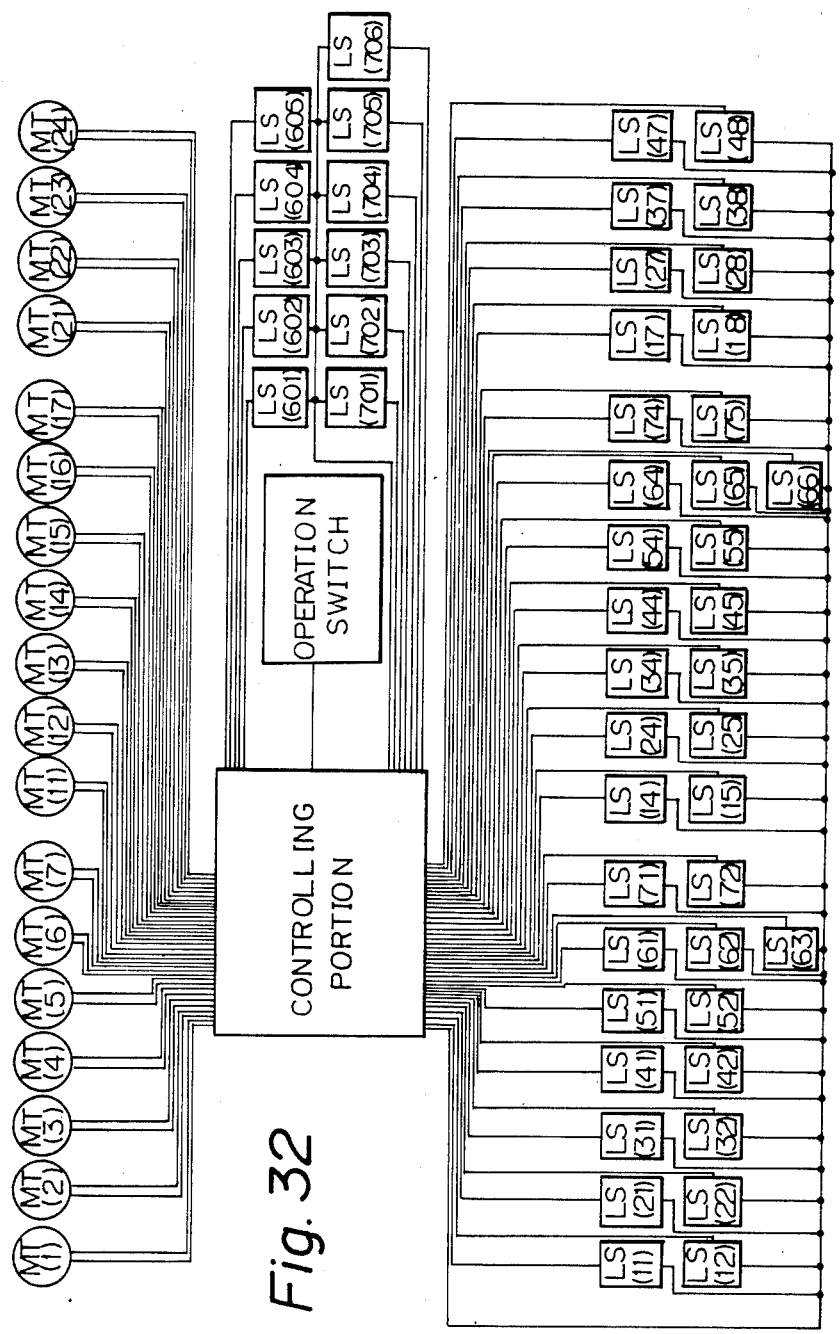
FIG. 32 is a system diagram of a controlling portion and an operation switching portion of the device shown in FIGS. 31A and 31B.

The controlling portion and the operation switch for controlling the power seats shown in FIGS. 31A and 31B are shown in FIG. 32. In the circuit shown in FIG. 32, the limit switches LS(601) to LS(605) correspond to the weight-pressure sensors 601, 602, 603, 604, and 605, and the limit switches LS(701) to LS(706) correspond to the pressure sensitive electrically conductive rubber elements 701, 702, 703, 704, 705, and 706.

The control of the power seats shown in FIGS. 31A and 31B is carried out in such a manner that automatic operation of the power seat cannot take place if at least one of the weight-pressure sensors and the pressure sensitive electrically conductive rubber elements is ON. However, it is possible to realize a face-to-face state of the seats on one side and a fully-flat state of the seats on one side, unless a person(s) or article(s) are within the range of the motion of the seats.

In the automatic operation of the power seats, because the weight-pressure sensors LS(601) to LS(605) and the pressure sensitive electrically conductive rubber elements LS(701) to LS(706) are provided, the controlling portion stops the automatic operation of the power seats, and simultaneously delivers a warning, if at least one of the weight-pressure sensors and the pressure sensitive electrically conductive rubber elements is ON.

Figure 33B:
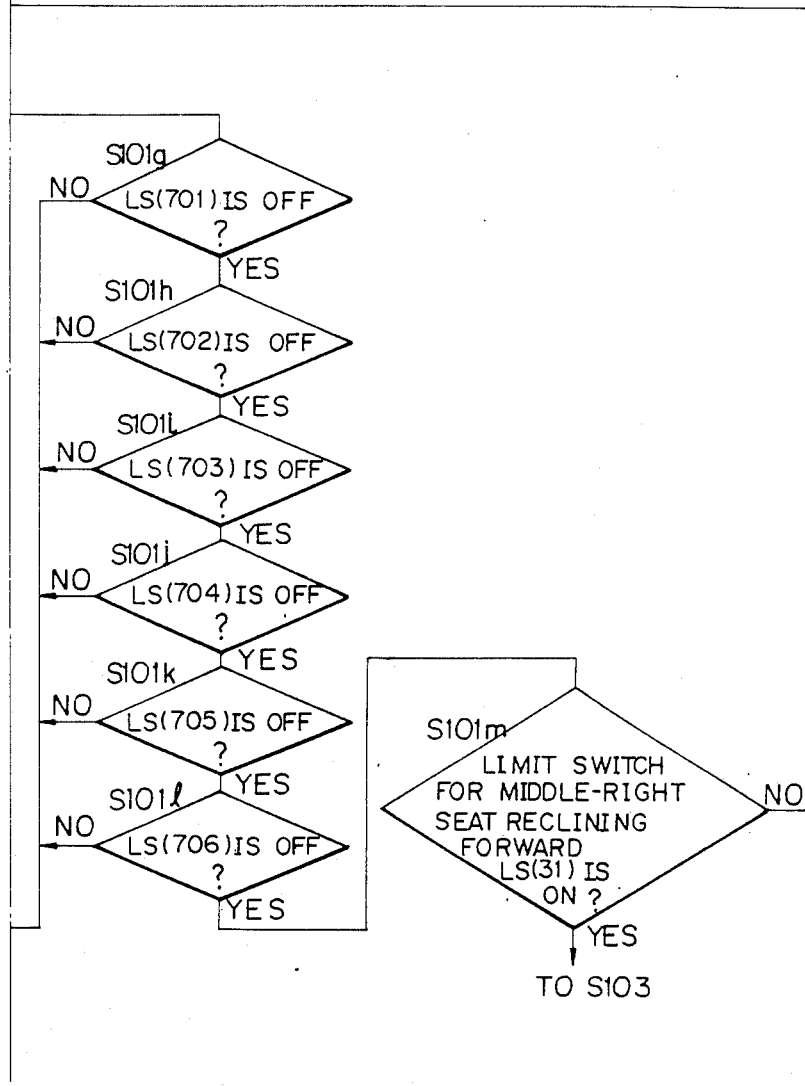
FIG. 33 is a flow chart showing the flow of operation of the system shown in FIG. 32.

The flow chart of the operation of the power seats shown in FIGS. 31A and 31B is shown in FIG. 33. The flow shown in FIG. 33 includes the steps of S101a to S101m from S101 shown in FIG. 13.

Since all of the the weight-pressure sensors LS(601) to LS(605) and the pressure sensitive electrically conductive rubber elements LS(701) to LS(706) are connected in series, as shown in steps S101b to S101l, the process goes to the NO outputs of steps S101b to S101l, if a person(s) or article(s) are on or around the power seats. In this case, the motor MT(3) for reclining the middle-right seat is stopped, and simultaneously, a warning is delivered.

Subsequently, if the person(s) leaves the vehicle or the article(s) is moved out of the vehicle, the automatic operation of the power seats can be restarted by using the operation switch.

The operation switch cannot be operated until the delivery of the warning stops, and the weight-pressure sensors LS(601) to LS(605) and the pressure sensitive electrically conductive rubber element LS(701) LS(706) are switched OFF.

Thus, when a person or article is on or around the seat, the automatic operation can not take place and the delivery of a warning is maintained until the person and or article leaves or is removed from the vehicle, regardless of any possible operations of the operation switch.

The above-described process of FIG. 33 is shown by the steps S103, S104, S106 to S109, S112 to S114, S116 to S118, S120 to S123 and S126 to S131, where any one of the motors is operated and the automatic operation is carried out.

The apparatus is arranged in such a manner that, during automatic operation, if a person sits down on the seat or stands in the vicinity of the seat or an article is placed on or around the seat, the automatic operation is immediately stopped and, simultaneously, a warning is delivered.

Other types of pressure sensors such as a tape switch or the like can be used, such as non-contact type sensors, i.e., photo-electric tubes, the ultrasonic type, or the like, instead of the weight-pressure sensor or the pressure sensitive electrically conductive rubber elements in the above-described embodiment.

Where the automatic operation of only a selected number of the power seats is carried out, for example the operation for realizing the fully-flat state of the middle-right seat is carried out, it is possible to ignore the states of a selected number of sensors, for example the weight-pressure sensors LS(602) and LS(605), and the pressure sensitive electrically conductive rubber elements LS(702), LS(703), and LS(705) which are outside the range of the operation, instead of taking into consideration the states of all sensors as in the above-described embodiment.

We claim:

1. Apparatus for controlling a plurality of power seats in a vehicle comprising:
   a plurality of power seats in a vehicle, each of said power seats having adjusting mechanisms;
   operation state detection means for detecting operational states of said mechanisms of said power seats, and for providing output signals corresponding to said operational states;
   switch means for (a) providing output signals to adjust said mechanisms to bring said mechanisms to a desired operational state; and
   control means for receiving said output signals from said operation state detection means and said output signals from said switch means, and for (b) controlling the mechanisms of said power seats to the desired operational state in accordance with a predetermined sequence of processing and to cause each said power seat to reach its desired operational state in response to the detected operational state of at least one other power seat.

2. Apparatus according to claim 1, wherein said control means causes rotation of one of said plurality of power seats only after one other of said plurality of power seats has been moved to a position where said other power seat does not interfere with the rotation of said one power seat.

3. Apparatus according to claim 2, wherein said control means causes rotation of said one power seat while simultaneously preventing rotations of other power seats.

4. Apparatus according to claim 1, wherein said control means causes rotation of one of said plurality of power seats only after the operational state of said one power seat is brought to a non-reclining operational states, to prevent interference with another of said power seats during the rotation of said one power seat 1.

5. Apparatus according to claim 1, wherein said control means causes rotation of one of said power seats only after a seat-cushion of said one power seat is moved to the position where no interference with another of said power seats occurs during the rotation of said one power seat.

6. Apparatus according to claim 1, wherein each of said plurality of power seats has a fully-flat operational state and has a head rest with a stored operational state and a regular operational state, and wherein said control means causes the adjustment of said head rest between the stored operational state and the regular operational state such that the change of the operational state of said head rest is carried out only when the operational state of said each seat is such that said head rest does not interfere with the adjustment of said each power seat.

7. Apparatus according to claim 1, wherein each of said plurality of power seats has a fully-flat operational state and a regular operational state, and wherein each of said plurality of power seats has a seat cushion, and wherein said control means causes adjustment of said each power seat from the regular operational state to the fully-flat operational state or from the fully-flat operational state to the regular operational state such that the adjustment of said each power seat is carried out only when a seat cushion of said each power seat is detected as being in a position where it will not interfere with the adjustment of said each power seat to a fully-flat operational state.

8. Apparatus according to claim 1, wherein each of said plurality of power seats has a fully-flat operational state and a regular operational state, and wherein said control means causes the adjustment of said each power seat from the regular operational state to the fully-flat operational state or from the fully-flat operational state to the regular operational state such that a power seat located behind said each power seat is moved backward to a position where said behind power seat does not interfere with the adjustment of said each power seat to a fully-flat operational state.

9. Apparatus according to claim 1, wherein each of said plurality of power seats has a non-reclined operational state and a reclined operational state, and wherein said control means causes movement of said each power seat in a backward direction only after the operational state of said each power seat has been changed from the reclined operational state to the non-reclined operational state.

10. Apparatus according to claim 1, wherein said control means provides a warning signal when the adjustment of one of said mechanisms is taking place.

11. Apparatus according to claim 1 wherein each one of said plurality of power seats has a fully-flat operational state, a regular operational state, and an arm rest having a stored state, and wherein said control means causes said arm-rest to be brought to the stored state when said each power state is adjusted from said regular operational state to said fully-flat operational state.

12. Apparatus according to claim 1, wherein each of said plurality of power seats has an arm-rest, and wherein at least a portion of said switch means is disposed in said arm-rest.

13. Apparatus according to claim 12, wherein said arm-rest includes means for storing said portion of said switch in said arm-rest in a stored state.

14. Apparatus according to claim 1, wherein each of said plurality of power seats includes a resistance force detector for detecting a resistance force counteracting an adjustment motion of said each power seat, said resistance force detector providing an output signal when said resistance force is detected, and wherein said control means, in response to signals from said switch means and said resistance force detector, stops the adjustment of said each power seat.

15. Apparatus according to claim 1, wherein said plurality of power seats includes at least one seat of a first type, and at least one seat of a second type, and wherein said one seat of said first type has an adjustment mechanism for providing lateral motion to said one seat of said one type to enable it to be adjusted in a direction toward said one seat of said second type.

16. Apparatus according to claim 1, further including object existence detectors disposed adjacent said plurality of power seats for detecting the existence of an object adjacent one of said power seats, said object existence detectors providing output signals when an object is detected adjacent one of said power seats; and wherein said control means, in response to the signals from said object existence detectors, stops adjustment of at least said adjacent power seat when an object is detected adjacent said one power said seat.

17. Apparatus according to claim 16, wherein said control means provides a warning signal when an object has been detected adjacent said one power seat.

* * * * *